United States Patent
An et al.

(10) Patent No.: US 11,146,826 B2
(45) Date of Patent: Oct. 12, 2021

(54) IMAGE FILTERING METHOD AND APPARATUS

(71) Applicant: HUAWEI TECHNOLOGIES CO., LTD., Guangdong (CN)

(72) Inventors: Jicheng An, Shenzhen (CN); Jianhua Zheng, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 7 days.

(21) Appl. No.: 16/457,041

(22) Filed: Jun. 28, 2019

(65) Prior Publication Data

US 2019/0387254 A1    Dec. 19, 2019

Related U.S. Application Data

(63) Continuation of application No. PCT/CN2016/113973, filed on Dec. 30, 2016.

(51) Int. Cl.
*H04N 19/86* (2014.01)
*H04N 19/119* (2014.01)
*H04N 19/176* (2014.01)
*H04N 19/186* (2014.01)

(52) U.S. Cl.
CPC .......... *H04N 19/86* (2014.11); *H04N 19/119* (2014.11); *H04N 19/176* (2014.11); *H04N 19/186* (2014.11)

(58) Field of Classification Search
None
See application file for complete search history.

(56) References Cited

U.S. PATENT DOCUMENTS

| | | | | |
|---|---|---|---|---|
| 9,094,658 | B2* | 7/2015 | Fu | H04N 19/174 |
| 9,294,770 | B2* | 3/2016 | Park | H04N 19/82 |
| 9,380,302 | B2* | 6/2016 | Kim | H04N 19/91 |
| 9,462,275 | B2 | 10/2016 | Guo et al. | |
| 10,171,833 | B2* | 1/2019 | Li | H04N 19/117 |
| 10,182,241 | B2* | 1/2019 | Li | H04N 19/59 |
| 10,440,396 | B2* | 10/2019 | Zhang | H04N 19/82 |

(Continued)

FOREIGN PATENT DOCUMENTS

| | | |
|---|---|---|
| CN | 1742281 A | 3/2006 |
| CN | 101964863 A | 2/2011 |

(Continued)

OTHER PUBLICATIONS

Search Report IP.com.*

(Continued)

*Primary Examiner* — Mohammad J Rahman
(74) *Attorney, Agent, or Firm* — Fish & Richardson P.C.

(57) ABSTRACT

An image filtering method and apparatus are disclosed. The method includes: obtaining a first index of the luma blocks, wherein the first index represents a filter type applicable to the luma blocks; obtaining a second index of the first chroma blocks, wherein the second index represents a filter type applicable to the first chroma blocks; filtering the luma blocks by applying a first filter in a filter set, the first filter corresponding to the first index; and filtering the first chroma blocks by applying a second filter in the filter set, the second filer corresponding to the second index.

15 Claims, 16 Drawing Sheets

(56) References Cited

U.S. PATENT DOCUMENTS

| | | | | |
|---|---|---|---|---|
| 2004/0120597 | A1* | 6/2004 | Le Dinh | H04N 19/186 |
| | | | | 382/261 |
| 2004/0126034 | A1 | 7/2004 | Yu et al. | |
| 2006/0098744 | A1* | 5/2006 | Huang | H04N 19/80 |
| | | | | 375/240.29 |
| 2006/0104349 | A1* | 5/2006 | Joch | H04N 19/86 |
| | | | | 375/240.03 |
| 2008/0123750 | A1* | 5/2008 | Bronstein | H04N 19/436 |
| | | | | 375/240.24 |
| 2013/0094572 | A1* | 4/2013 | Van der Auwera | H04N 19/126 |
| | | | | 375/240.03 |
| 2013/0101018 | A1* | 4/2013 | Chong | H04N 19/82 |
| | | | | 375/240.02 |
| 2013/0142267 | A1* | 6/2013 | Esenlik | H04N 19/80 |
| | | | | 375/240.29 |
| 2013/0322523 | A1* | 12/2013 | Huang | H04N 19/182 |
| | | | | 375/240.02 |
| 2014/0301480 | A1* | 10/2014 | Francois | H04N 19/139 |
| | | | | 375/240.25 |
| 2015/0016518 | A1* | 1/2015 | Li | H04N 19/156 |
| | | | | 375/240.12 |
| 2015/0098513 | A1* | 4/2015 | Fu | H04N 19/13 |
| | | | | 375/240.25 |
| 2015/0195533 | A1* | 7/2015 | Hsiang | H04N 19/70 |
| | | | | 375/240.02 |
| 2015/0215617 | A1* | 7/2015 | Leontaris | H04N 19/117 |
| | | | | 375/240.03 |
| 2016/0277762 | A1* | 9/2016 | Zhang | H04N 19/167 |
| 2017/0078704 | A1* | 3/2017 | Charmet | H04N 19/156 |
| 2017/0230656 | A1* | 8/2017 | Leontaris | H04N 19/117 |
| 2018/0316922 | A1* | 11/2018 | Nam | H04N 19/103 |

FOREIGN PATENT DOCUMENTS

| | | |
|---|---|---|
| CN | 102131098 A | 7/2011 |
| CN | 103281536 A | 9/2013 |
| CN | 103634609 A | 3/2014 |
| CN | 103891293 A | 6/2014 |
| WO | 2016074147 A1 | 5/2016 |
| WO | 2016195567 A1 | 12/2016 |

OTHER PUBLICATIONS

Search Report Google.*
Kossentini et al., "CE8 Subtest 5: Adaptive Loop Filtering of Luminance and Chrominance Samples Using Same Filtering Shape, Structure and Map", Joint Collaborative Team on Video Coding of ISO/ IEC JTC1/SC29/WG11 and ITU-T SG.16, JCTVC-F042, XP030009065, Jun. 23, 2011, 11 pages.
Chong et al., "CE8 Subtest 2: Block based adaptive loop filter", Joint Collaborative Team on Video Coding of ISO/IEC JTC1/SC29/WG11 and ITU-T SG.16, JCTVC-E323, XP030008829, Mar. 11, 2011, 4 pages.
Kossentini et al., "CE8 Subtest 4: Adaptive Loop Filtering Using Two Filter Shapes", (Joint Collaborative Team on Video Coding (JCT-VC) of ITU-T SG16 WP3 and 1S0/IEC JTC1/SC29/WG11), JCTVC-F041, XP030049010, Jul. 12, 2011, 12 pages.
Chen et al., "Algorithm Description of Joint Exploration Test Model 4", The Joint Video Exploration Team of ISO/IEC JTC1/SC29/WG11 and ITU-T SG.16, JVET-D1001, XP030150460, Oct. 28, 2016, 4 pages.
Partial Supplementary Extended European Search Report issued in European Application No. 16925296.2 dated Nov. 21, 2019, 18 pages.
Office Action issued in Chinese application No. 201680088453.1 dated Dec. 23, 2019, 39 pages (With English Translation).
ITU-T-H.265 (Apr. 2015), "Series H: Audiovisual and Multimedia Systems; Infrastructure of audiovisual services—Coding of moving video; High efficiency video coding," International Telecommunication Union, Apr. 2015, 634 pages.
PCT International Search Report and Written Opinion issued in International Application No. PCT/CN2016/113973 dated Sep. 6, 2017, 20 pages (with English translation).
Tsai et al., "Adaptive Loop Filtering for Video Coding," IEEE Journal of Selected Topics in Signal Processing, vol. 7, No. 6, Dec. 2013, pp. 934-945.
Extended European Search Report issued in European Application No. 16925296.2 dated May 13, 2020, 16 pages.

* cited by examiner (a) First index  (b) Luminance pixel block

■ Category a    □ Category b    ▨ Category c    ▨ Category d (a)          (b)

□ Pixel point    ⊞ Pixel block (a) First index (a) First index (a)            (b)

(a)            (b)            (c)

(a) First structure  (b) Second structure (a) First structure  (b) Second structure

|   |   |   |
|---|---|---|
| 0 | 1 | 1 |
| 1 | 0 | 0 |
| 1 | 1 | 0 |

(a) First structure

|   |   |   |
|---|---|---|
| 1 | 0 | 1 |
| 1 | 1 | 0 |
| 0 | 1 | 0 |

(b) Second structure

FIG. 20

|   |   |   |
|---|---|---|
| 0 | 1 | 1 |
| 1 | 0 | 0 |
| 1 | 1 | 0 |

(a) First structure

|   |   |   |
|---|---|---|
| 1 | 0 | 1 |
| 1 | 1 | 0 |
| 0 | 1 | 0 |

(b) Second structure

FIG. 21

(a) First structure (b) Second structure

FIG. 22

(a) First structure (b) Second structure (c) First structure

FIG. 23

(a) First structure (b) Second structure (c) First structure

FIG. 24

|   |   |   |
|---|---|---|
| 0 | 1 | 1 |
| 1 | 0 | 0 |
| 1 | 1 | 0 |

(a) First structure

| 1 | 0 | 1 |
|---|---|---|
| 1 | 1 | 0 |
| 0 | 1 | 0 |

(b) Second structure

|   |   |   |
|---|---|---|
| 0 | 1 | 1 |
| 1 | 0 | 0 |
| 1 | 1 | 0 |

(c) First structure

FIG. 25

(a) First structure  (b) Second structure  (c) Second structure

FIG. 26

| 0 | 1 | 1 |
|---|---|---|
| 1 | 0 | 0 |
| 1 | 1 | 0 |

(a) First structure

| 1 | 0 | 1 |
|---|---|---|
| 1 | 1 | 0 |
| 0 | 1 | 0 |

(b) Second structure

| 0 | 1 | 1 |
|---|---|---|
| 1 | 0 | 0 |
| 1 | 1 | 0 |

(c) Second structure

FIG. 27

| 0 | 1 | 1 |
|---|---|---|
| 1 | 0 | 0 |
| 1 | 1 | 0 |

(a) First structure

| 1 | 0 | 1 |
|---|---|---|
| 1 | 1 | 0 |
| 0 | 1 | 0 |

(b) Second structure

| 1 | 0 | 1 |
|---|---|---|
| 1 | 1 | 0 |
| 0 | 1 | 0 |

(c) Second structure

TO FIG. 32B

IMAGE FILTERING METHOD AND APPARATUS

CROSS-REFERENCE TO RELATED APPLICATIONS

This application is a continuation of International Application No. PCT/CN2016/113973, filed on Dec. 30, 2016, the disclosure of which is hereby incorporated by reference in its entirety.

TECHNICAL FIELD

The present invention relates to the image processing field, and in particular, to an image filtering method and apparatus.

BACKGROUND

Digital video apparatuses have been widely used currently. For example, the digital video apparatuses are a digital television, a digital live system, a radio broadcasting system, a personal digital assistant (PDA), a laptop or desktop computer, a digital camera, a digital recording apparatus, a digital media player, a video game apparatus, a video game console, a cellular or satellite radio telephone, and a video conferencing apparatus. A digital video apparatus usually compresses a video by using video compression technologies of a block-based hybrid video coding framework, so as to transmit, receive, and store digital video information more efficiently. For example, the video compression technologies include technologies from MPEG-1/2 to a latest video coding standard H.265/HEVC.

A person skilled in the art finds in long-term practice that, when the video is compressed by using the video compression technologies of the block-based hybrid video coding framework, block partitioning needs to be performed on each image in the video to improve processing efficiency; however, block partitioning inevitably causes image distortion, such as a blocking artifact.

SUMMARY

Embodiments of the present invention disclose an image filtering method and apparatus, so that image filtering accuracy can be improved, an image distortion rate can be reduced, and a bit rate occupied for transmitting a filtering coefficient can be reduced.

A first aspect of the embodiments of the present invention provides an image filtering method, where a to-be-processed image includes a plurality of luma blocks and a plurality of first chroma blocks, each luma block includes a plurality of adjacent luma pixels, each first chroma block includes a plurality of adjacent first chroma pixels, and the method includes: obtaining a first index of the luma block, where the first index represents a filter type applicable to an image feature corresponding to the luma block; obtaining a second index of the first chroma block, where the second index represents a filter type applicable to an image feature corresponding to the first chroma block; filtering the luma block by applying a filter, corresponding to the first index, in a filter set; and filtering the first chroma block by applying a filter, corresponding to the second index, in the filter set.

This embodiment of the present invention has the following beneficial effects: The filter used for filtering the first chroma blocks is usually the filter used for filtering the luma blocks. Therefore, a filtering coefficient of the filter for filtering the first chroma blocks does not need to be additionally transferred, so that a bit rate occupied for transferring the filtering coefficient of the filter is reduced.

In a feasible implementation of the first aspect, when a value of the first index is the same as a value of the second index, the filter corresponding to the first index is the same as the filter corresponding to the second index.

In a feasible implementation of the first aspect, the to-be-processed image further includes a plurality of second chroma blocks, each second chroma block includes a plurality of adjacent second chroma pixels, and after the obtaining a second index of the first chroma block, the method further includes: obtaining a third index of the second chroma block, where the third index represents a filter type applicable to an image feature corresponding to the second chroma block; and correspondingly, after the filtering the first chroma block by applying a filter, corresponding to the second index, in the filter set, the method further includes: filtering the second chroma block by applying a filter, corresponding to the third index, in the filter set.

This embodiment of the present invention has the following beneficial effects: After the plurality of first chroma blocks are filtered by applying the filter corresponding to the second index, a target filter may be further determined for the second chroma blocks, and the plurality of second chroma blocks are filtered by using the target filter, so that image filtering accuracy is further improved, and an image distortion rate is reduced.

In a feasible implementation of the first aspect, the obtaining a first index of the luma block includes: classifying the luma blocks based on a first relationship, to obtain the first index, where the first relationship includes texture direction and a variation intensity of an image area corresponding to the luma block.

In a feasible implementation of the first aspect, the texture direction and the variation intensity of the image area corresponding to the luma block are obtained by using a pixel at a preset location in the luma block and a neighborhood pixel of the pixel at the preset location in the luma block.

In a feasible implementation of the first aspect, the obtaining a second index of the first chroma block includes: classifying the first chroma blocks based on a second relationship, to obtain the second index, where the second relationship includes texture direction and a variation intensity of an image area corresponding to the first chroma block.

In a feasible implementation of the first aspect, the texture direction and the variation intensity of the image area corresponding to the first chroma block are obtained by using a pixel at a preset location in the first chroma block and a neighborhood pixel of the pixel at the preset location in the first chroma block.

This embodiment of the present invention has the following beneficial effects: The second index of each first chroma block can be accurately calculated, and the corresponding first chroma blocks are filtered by using a more appropriate filter, so that filtering accuracy is improved.

In a feasible implementation of the first aspect, the obtaining a second index of the first chroma block includes: using the first index of the luma block in the same image area corresponding to the first chroma block as the second index.

This embodiment of the present invention has the following beneficial effects: The first chroma blocks have no index, and the first index of the luma blocks in the same corresponding image areas is directly reused, so that a bit rate occupied for transmitting an index to a decoder by an encoder is reduced.

In a feasible implementation of the first aspect, the obtaining a third index of the second chroma block includes: classifying the second chroma blocks based on a third relationship, to obtain the third index, where the third relationship includes texture direction and a variation intensity of an image area corresponding to the second chroma block.

In a feasible implementation of the first aspect, the texture direction and the variation intensity of the image area corresponding to the second chroma block are obtained by using a pixel at a preset location in the second chroma block and a neighborhood pixel of the pixel at the preset location in the second chroma block.

This embodiment of the present invention has the following beneficial effects: The third index of each second chroma block can be accurately calculated, and the corresponding second chroma blocks are filtered by using a more appropriate filter, so that filtering accuracy is improved.

In a feasible implementation of the first aspect, the obtaining a third index of the second chroma block includes: using the first index of the luma block in the same image area corresponding to the second chroma block as the third index; or using the second index of the first chroma block in the same image area corresponding to the second chroma block as the third index.

This embodiment of the present invention has the following beneficial effects: The second chroma block has no index, and the second index of the first chroma block in the same corresponding image area is directly reused, so that a bit rate occupied for transmitting an index to a decoder by an encoder is reduced.

In a feasible implementation of the first aspect, at least two of the first relationship, the second relationship, and the third relationship are the same.

This embodiment of the present invention has the following beneficial effects: When the first relationship, the second relationship, and the third relationship are the same, the filter used for filtering the first chroma blocks, the filter used for filtering the second chroma blocks, and the filter used for filtering the luma blocks are usually the same. Therefore, a filtering coefficient of the filter for filtering the first chroma blocks and the second chroma blocks does not need to be additionally transferred, so that a bit rate occupied for transferring the filtering coefficient of the filter is reduced.

In a feasible implementation of the first aspect, the first relationship, the second relationship, and the third relationship are different from each other.

In a feasible implementation of the first aspect, a size of the first chroma block is greater than that of the luma block; and a size of the second chroma block is greater than that of the luma block.

This embodiment of the present invention has the following beneficial effects: Different processing manners may be used based on different image details included in a chroma block and a luma block, so that processing efficiency is improved.

In a feasible implementation of the first aspect, the method is used for a decoder, and before the obtaining a first index of the luma block, the method further includes: parsing a bitstream, to obtain information about the filter set.

In a feasible implementation of the first aspect, the method is used for an encoder, and before the obtaining a first index of the luma block, the method further includes: selecting a candidate filter set with minimum encoding cost from preset candidate filters set as the filter set; and encoding information about the filter set.

In a feasible implementation of the first aspect, before the obtaining a first index of the luma block, the method further includes: partitioning luma pixels of the to-be-processed image into a plurality of luma control blocks based on a first structure, where each luma control block includes one or more adjacent luma blocks; and determining one or more to-be-filtered luma control blocks in the to-be-processed image.

In a feasible implementation of the first aspect, the determining one or more to-be-processed luminance control blocks in the to-be-processed image includes: determining luminance filtering identifiers of the to-be-processed image, where the luma filtering identifiers represent whether the respective luma control blocks in the to-be-processed image is to be filtered.

This embodiment of the present invention has the following beneficial effects: Filtering different areas of an image is controlled independently, so that applicability of the filtering method is improved.

In a feasible implementation of the first aspect, the partitioning luma pixels of the to-be-processed image into a plurality of luma control blocks based on a first structure includes: partitioning the luma pixels of the to-be-processed image into one or more equal-sized first initially partitioned blocks based on a preset size; and performing quadtree or binary-tree partitioning on the first initially partitioned blocks, to obtain the plurality of luma control blocks.

This embodiment of the present invention has the following beneficial effects: Image area partitioning is more flexible, and this better facilitates regional filtering.

In a feasible implementation of the first aspect, the method is used for the decoder, and the determining one or more to-be-filtered luma control blocks in the to-be-processed image includes: decoding the bitstream, to obtain information about the luma filtering identifiers.

In a feasible implementation of the first aspect, the method is used for the encoder, and the determining one or more to-be-filtered luma control blocks in the to-be-processed image includes: selecting candidate luma filtering identifiers with minimum encoding cost from a preset candidate luma filtering identifier set as the luma filtering identifiers.

In a feasible implementation of the first aspect, after the determining one or more to-be-filtered luma control blocks in the to-be-processed image, the method further includes: encoding information about the luma filtering identifiers.

In a feasible implementation of the first aspect, after the determining one or more to-be-filtered luma control blocks in the to-be-processed image, the method further includes: determining one or more to-be-filtered first chroma control blocks in the to-be-processed image, where each first chroma control block includes one or more adjacent first chroma blocks.

In a feasible implementation of the first aspect, first chroma filtering identifiers represent whether the respective first chroma control blocks in the to-be-processed image are to be filtered.

This embodiment of the present invention has the following beneficial effects: Filtering different areas of an image is controlled independently, so that applicability of the filtering method is improved.

In a feasible implementation of the first aspect, before the determining one or more to-be-filtered first chroma control blocks in the to-be-processed image, the method further includes: partitioning first chroma pixels of the to-be-processed image into a plurality of first chroma control blocks based on the first structure; and correspondingly, the determining one or more to-be-filtered first chroma control blocks in the to-be-processed image includes: obtaining the first chroma filtering identifiers by mapping the luma filtering identifiers.

This embodiment of the present invention has the following beneficial effects: Partitioning the luma pixels and partitioning the first chroma pixels can be implemented more easily. In addition, the luma filtering identifiers of the luma control blocks are associated with the first chroma filtering identifiers of the first chroma control blocks, so that filtering identifier setting can be simplified, and a bit rate occupied for transmitting filtering identifiers to a decoder by an encoder can also be reduced.

In a feasible implementation of the first aspect, before the determining one or more to-be-filtered first chroma control blocks in the to-be-processed image, the method further includes: partitioning first chroma pixels of the to-be-processed image into a plurality of first chroma control blocks based on a second structure.

This embodiment of the present invention has the following beneficial effects: According to this implementation, the luma pixels and the first chroma pixels can be partitioned based on different structures depending on an actual requirement, so that freedom of filtering control is improved, and filtering accuracy is improved. In addition, the luma filtering identifiers of the luma control blocks and the first chroma filtering identifiers of the first chroma control blocks each are independently set, so that the freedom of filtering control can be further improved, and the filtering accuracy is also further improved.

In a feasible implementation of the first aspect, the partitioning first chroma pixels of the to-be-processed image into a plurality of first chroma control blocks based on a second structure includes: partitioning the first chroma pixels of the to-be-processed image into one or more equal-sized second initially partitioned blocks based on a preset size; and performing quadtree or binary-tree partitioning on the second initially partitioned blocks, to obtain the plurality of first chroma control blocks.

In a feasible implementation of the first aspect, the method is used for the decoder, and the determining one or more to-be-filtered first chroma control blocks in the to-be-processed image includes: decoding the bitstream, to obtain information about the first chroma filtering identifiers.

In a feasible implementation of the first aspect, the method is used for the encoder, and the determining one or more to-be-filtered first chroma control blocks in the to-be-processed image includes: selecting candidate first chroma filtering identifiers with minimum encoding cost from a preset candidate first chroma filtering identifier set as the first chroma filtering identifiers.

In a feasible implementation of the first aspect, after the determining one or more to-be-filtered first chroma control blocks in the to-be-processed image, the method further includes: encoding information about the first chroma filtering identifiers.

In a feasible implementation of the first aspect, after the determining one or more to-be-filtered first chroma control blocks in the to-be-processed image, the method further includes: determining one or more to-be-filtered second chroma control blocks in the to-be-processed image, where each second chroma control block includes one or more adjacent second chroma blocks.

In a feasible implementation of the first aspect, second chroma filtering identifiers represent whether the respective second chroma control blocks in the to-be-processed image are to be filtered.

This embodiment of the present invention has the following beneficial effects: After the one or more to-be-filtered first chroma control blocks in the to-be-processed image are determined, second chroma pixels of the to-be-processed image may be further partitioned into a plurality of second chroma control blocks, and then the one or more to-be-filtered second chroma control blocks in the to-be-processed image are determined, to determine whether to filter the second chroma control blocks of the to-be-processed image, so that image filtering accuracy is further improved, and an image distortion rate is reduced.

In a feasible implementation of the first aspect, before the determining one or more to-be-filtered second chroma control blocks in the to-be-processed image, the method further includes: partitioning second chroma pixels of the to-be-processed image into a plurality of second chroma control blocks based on the first structure; and correspondingly, the determining one or more to-be-filtered second chroma control blocks in the to-be-processed image includes: obtaining the second chroma filtering identifiers by mapping the luma filtering identifiers.

This embodiment of the present invention has the following beneficial effects: Partitioning the luma pixels and partitioning the second chroma pixels can be implemented more easily. In addition, the luma filtering identifiers of the luma control blocks are associated with the second chroma filtering identifiers of the second chroma control blocks, so that filtering identifier setting can be simplified, and a bit rate occupied for transmitting filtering identifiers to a decoder by an encoder can also be reduced.

In a feasible implementation of the first aspect, before the determining one or more to-be-filtered second chroma control blocks in the to-be-processed image, the method further includes: partitioning second chroma pixels of the to-be-processed image into a plurality of second chroma control blocks based on the second structure; and correspondingly, the determining one or more to-be-filtered second chroma control blocks in the to-be-processed image includes: obtaining the second chroma filtering identifiers by mapping the first chroma filtering identifiers.

This embodiment of the present invention has the following beneficial effects: Partitioning the first chroma pixels and partitioning the second chroma pixels can be implemented more easily. In addition, the first chroma filtering identifiers of the first chroma control blocks are associated with the second chroma filtering identifiers of the second chroma control blocks, so that filtering identifier setting can be simplified, and a bit rate occupied for transmitting filtering identifiers to a decoder by an encoder can also be reduced.

In a feasible implementation of the first aspect, before the determining one or more to-be-filtered second chroma control blocks in the to-be-processed image, the method further includes: partitioning second chroma pixels of the to-be-processed image into a plurality of second chroma control blocks based on a third structure.

In a feasible implementation of the first aspect, the partitioning second chroma pixels of the to-be-processed image into a plurality of second chroma control blocks based on a third structure includes: partitioning the second chroma pixels of the to-be-processed image into one or more equal-sized third initially partitioned blocks based on a preset size; and performing quadtree or binary-tree partitioning on the third initially partitioned blocks, to obtain the plurality of second chroma control blocks.

In a feasible implementation of the first aspect, the method is used for the decoder, and the determining one or more to-be-filtered second chroma control blocks in the to-be-processed image includes: decoding the bitstream, to obtain information about the second chroma filtering identifiers.

In a feasible implementation of the first aspect, the method is used for the encoder, and the determining one or more to-be-filtered second chroma control blocks in the to-be-processed image includes: selecting candidate second chroma filtering identifiers with minimum encoding cost from a preset candidate second chroma filtering identifier set as the second chroma filtering identifiers.

In a feasible implementation of the first aspect, after the determining one or more to-be-filtered second chroma control blocks in the to-be-processed image, the method further includes: encoding information about the second chroma filtering identifiers.

In a feasible implementation of the first aspect, at least two of the first structure, the second structure, and the third structure are the same.

In a feasible implementation of the first aspect, the first structure, the second structure, and the third structure are different from each other.

A second aspect of the embodiments of the present invention provides an image filtering apparatus, where a to-be-processed image includes a plurality of luma blocks and a plurality of first chroma blocks, each luma block includes a plurality of adjacent luma pixels, each first chroma block includes a plurality of adjacent first chroma pixels, and the apparatus includes: an obtaining module, configured to obtain a first index of the luma block, where the first index represents a filter type applicable to an image feature corresponding to the luma block, the obtaining module is further configured to obtain a second index of the first chroma block, and the second index represents a filter type applicable to an image feature corresponding to the first chroma block; and a filtering module, configured to filter the luma block by applying a filter, corresponding to the first index, in a filter set, where the filtering module is further configured to filter the first chroma block by applying a filter, corresponding to the second index, in the filter set.

In a feasible implementation of the second aspect, when a value of the first index is the same as a value of the second index, the filter corresponding to the first index is the same as the filter corresponding to the second index.

In a feasible implementation of the second aspect, the to-be-processed image further includes a plurality of second chroma blocks, each second chroma block includes a plurality of adjacent second chroma pixels, and the obtaining module is further configured to obtain a third index of the second chroma block, where the third index represents a filter type applicable to an image feature corresponding to the second chroma block; and correspondingly, the filtering module is further configured to filter the second chroma block by applying a filter, corresponding to the third index, in the filter set.

In a feasible implementation of the second aspect, the obtaining module is specifically configured to classify the luma blocks based on a first relationship, to obtain the first index, where the first relationship includes texture direction and a variation intensity of an image area corresponding to the luma block.

In a feasible implementation of the second aspect, the texture direction and the variation intensity of the image area corresponding to the luma block are obtained by using a pixel at a preset location in the luma block and a neighborhood pixel of the pixel at the preset location in the luma block.

In a feasible implementation of the second aspect, the obtaining module is specifically configured to classify the first chroma blocks based on a second relationship, to obtain the second index, where the second relationship includes texture direction and a variation intensity of an image area corresponding to the first chroma block.

In a feasible implementation of the second aspect, the texture direction and the variation intensity of the image area corresponding to the first chroma block are obtained by using a pixel at a preset location in the first chroma block and a neighborhood pixel of the pixel at the preset location in the first chroma block.

In a feasible implementation of the second aspect, the obtaining module is specifically configured to use the first index of the luma block in the same image area corresponding to the first chroma block as the second index.

In a feasible implementation of the second aspect, the obtaining module is specifically configured to classify the second chroma blocks based on a third relationship, to obtain the third index, where the third relationship includes texture direction and a variation intensity of an image area corresponding to the second chroma block.

In a feasible implementation of the second aspect, the texture direction and the variation intensity of the image area corresponding to the second chroma block are obtained by using a pixel at a preset location in the second chroma block and a neighborhood pixel of the pixel at the preset location in the second chroma block.

In a feasible implementation of the second aspect, the obtaining module is specifically configured to use the first index of the luma block in the same image area corresponding to the second chroma block as the third index; or use the second index of the first chroma block in the same image area corresponding to the second chroma block as the third index.

In a feasible implementation of the second aspect, at least two of the first relationship, the second relationship, and the third relationship are the same.

In a feasible implementation of the second aspect, the first relationship, the second relationship, and the third relationship are different from each other.

In a feasible implementation of the second aspect, a size of the first chroma block is greater than that of the luma block; and a size of the second chroma block is greater than that of the luma block.

In a feasible implementation of the second aspect, the apparatus is used for a decoder, and the apparatus further includes a decoding module, configured to parse a bitstream, to obtain information about the filter set.

In a feasible implementation of the second aspect, the apparatus is used for an encoder, and the apparatus further includes an encoding module, configured to: select a candidate filter set with minimum encoding cost from preset candidate filters set as the filter set; and encode information about the filter set.

In a feasible implementation of the second aspect, the apparatus further includes: a partitioning module, configured to partition luma pixels of the to-be-processed image into a plurality of luma control blocks based on a first structure, where each luma control block includes one or more adjacent luma blocks; and an identification module, configured to determine one or more to-be-filtered luma control blocks in the to-be-processed image.

In a feasible implementation of the second aspect, the identification module is specifically configured to determine luma filtering identifiers, where the luma filtering identifiers represent whether the respective luma control blocks in the to-be-processed image are to be filtered.

In a feasible implementation of the second aspect, the partitioning module is specifically configured to: partition the luma pixels of the to-be-processed image into one or more equal-sized first initially partitioned blocks based on a preset size; and perform quadtree or binary-tree partitioning on the first initially partitioned blocks, to obtain the plurality of luma control blocks.

In a feasible implementation of the second aspect, the apparatus is used for the decoder, and the decoding module is further configured to decode the bitstream, to obtain information about the luma filtering identifiers.

In a feasible implementation of the second aspect, the apparatus is used for the encoder, and the encoding module is further configured to select candidate luma filtering identifiers with minimum encoding cost from a preset candidate luma filtering identifier set as the luma filtering identifiers.

In a feasible implementation of the second aspect, the encoding module is further configured to encode information about the luma filtering identifiers.

In a feasible implementation of the second aspect, the identification module is further configured to determine one or more to-be-filtered first chroma control blocks in the to-be-processed image, where each first chroma control block includes one or more adjacent first chroma blocks.

In a feasible implementation of the second aspect, the identification module is specifically configured to determine first chroma filtering identifiers, where the first chroma filtering identifiers represent whether the respective first chroma control blocks in the to-be-processed image are to be filtered.

In a feasible implementation of the second aspect, the partitioning module is further configured to partition first chroma pixels of the to-be-processed image into a plurality of first chroma control blocks based on the first structure; and correspondingly, the identification module is further configured to obtain the first chroma filtering identifiers by mapping the luma filtering identifiers.

In a feasible implementation of the second aspect, the partitioning module is further configured to partition first chroma pixels of the to-be-processed image into a plurality of first chroma control blocks based on a second structure.

In a feasible implementation of the second aspect, the partitioning module is further specifically configured to: partition the first chroma pixels of the to-be-processed image into one or more equal-sized second initially partitioned blocks based on a preset size; and perform quadtree or binary-tree partitioning on the second initially partitioned blocks, to obtain the plurality of first chroma control blocks.

In a feasible implementation of the second aspect, the apparatus is used for the decoder, and the decoding module is further configured to decode the bitstream, to obtain information about the first chroma filtering identifiers.

In a feasible implementation of the second aspect, the apparatus is used for the encoder, and the encoding module is further configured to select candidate first chroma filtering identifiers with minimum encoding cost from a preset candidate first chroma filtering identifier set as the first chroma filtering identifiers.

In a feasible implementation of the second aspect, the encoding module is further configured to encode information about the first chroma filtering identifiers.

In a feasible implementation of the second aspect, the identification module is further configured to determine one or more to-be-filtered second chroma control blocks in the to-be-processed image, where each second chroma control block includes one or more adjacent second chroma blocks.

In a feasible implementation of the second aspect, the identification module is specifically configured to determine second chroma filtering identifiers, where the second chroma filtering identifiers represent whether the respective second chroma control blocks in the to-be-processed image are to be filtered.

In a feasible implementation of the second aspect, the partitioning module is further configured to partition second chroma pixels of the to-be-processed image into a plurality of second chroma control blocks based on the first structure; and correspondingly, the identification module is further configured to obtain the second chroma filtering identifiers by mapping the luma filtering identifiers.

In a feasible implementation of the second aspect, the partitioning module is further configured to partition second chroma pixels of the to-be-processed image into a plurality of second chroma control blocks based on the second structure; and correspondingly, the identification module is further configured to obtain the second chroma filtering identifiers by mapping the first chroma filtering identifiers.

In a feasible implementation of the second aspect, the partitioning module is further configured to partition second chroma pixels of the to-be-processed image into a plurality of second chroma control blocks based on a third structure.

In a feasible implementation of the second aspect, the partitioning module is further specifically configured to: partition the second chroma pixels of the to-be-processed image into one or more equal-sized third initially partitioned blocks based on a preset size; and perform quadtree or binary-tree partitioning on the third initially partitioned blocks, to obtain the plurality of second chroma control blocks.

In a feasible implementation of the second aspect, the apparatus is used for the decoder, and the decoding module is further configured to decode the bitstream, to obtain information about the second chroma filtering identifiers.

In a feasible implementation of the second aspect, the apparatus is used for the encoder, and the encoding module is further configured to select candidate second chroma filtering identifiers with minimum encoding cost from a preset candidate second chroma filtering identifier set as the second chroma filtering identifiers.

In a feasible implementation of the second aspect, the encoding module is further configured to encode information about the second chroma filtering identifiers.

In a feasible implementation of the second aspect, at least two of the first structure, the second structure, and the third structure are the same.

In a feasible implementation of the second aspect, the first structure, the second structure, and the third structure are different from each other.

A third aspect of the embodiments of the present invention provides an image filtering method, where a to-be-processed image includes a plurality of luma blocks and a plurality of first chroma blocks, each luma block includes a plurality of adjacent luma pixels, each first chroma block includes a plurality of adjacent first chroma pixels, and the method includes: obtaining a first index of the luma block, where the first index represents a filter type applicable to an image feature corresponding to the luma block; obtaining a second index of the first chroma block, where the second index represents a filter type applicable to an image feature corresponding to the first chroma block; filtering the luma block by applying a filter, corresponding to the first index, in a filter set; and filtering the first chroma block by applying a filter, corresponding to the second index, in the filter set.

In a feasible implementation of the third aspect, when a value of the first index is the same as a value of the second index, the filter corresponding to the first index is the same as the filter corresponding to the second index.

In a feasible implementation of the third aspect, the to-be-processed image further includes a plurality of second chroma blocks, each second chroma block includes a plurality of adjacent second chroma pixels, and after the obtaining a second index of the first chroma block, the method further includes: obtaining a third index of the second chroma block, where the third index represents a filter type applicable to an image feature corresponding to the second chroma block; and correspondingly, after the filtering the first chroma block by applying a filter, corresponding to the second index, in the filter set, the method further includes: filtering the second chroma block by applying a filter, corresponding to the third index, in the filter set.

In a feasible implementation of the third aspect, the obtaining a first index of the luma block includes: classifying the luma blocks based on a first relationship, to obtain the first index, where the first relationship includes texture direction and a variation intensity of an image area corresponding to the luma block.

In a feasible implementation of the third aspect, the texture direction and the variation intensity of the image area corresponding to the luma block are obtained by using a pixel at a preset location in the luma block and a neighborhood pixel of the pixel at the preset location in the luma block.

In a feasible implementation of the third aspect, the obtaining a second index of the first chroma block includes: classifying the first chroma blocks based on a second relationship, to obtain the second index, where the second relationship includes texture direction and a variation intensity of an image area corresponding to the first chroma block.

In a feasible implementation of the third aspect, the texture direction and the variation intensity of the image area corresponding to the first chroma block are obtained by using a pixel at a preset location in the first chroma block and a neighborhood pixel of the pixel at the preset location in the first chroma block.

In a feasible implementation of the third aspect, the obtaining a second index of the first chroma block includes: using the first index of the luma block in the same image area corresponding to the first chroma block as the second index.

In a feasible implementation of the third aspect, the obtaining a third index of the second chroma block includes: classifying the second chroma blocks based on a third relationship, to obtain the third index, where the third relationship includes texture direction and a variation intensity of an image area corresponding to the second chroma block.

In a feasible implementation of the third aspect, the texture direction and the variation intensity of the image area corresponding to the second chroma block are obtained by using a pixel at a preset location in the second chroma block and a neighborhood pixel of the pixel at the preset location in the second chroma block.

In a feasible implementation of the third aspect, the obtaining a third index of the second chroma block includes: using the first index of the luma block in the same image area corresponding to the second chroma block as the third index; or using the second index of the first chroma block in the same image area corresponding to the second chroma block as the third index.

In a feasible implementation of the third aspect, at least two of the first relationship, the second relationship, and the third relationship are the same.

In a feasible implementation of the third aspect, the first relationship, the second relationship, and the third relationship are different from each other.

In a feasible implementation of the third aspect, a size of the first chroma block is greater than that of the luma block; and a size of the second chroma block is greater than that of the luma block.

In a feasible implementation of the third aspect, the method is used for a decoder, and before the obtaining a first index of the luma block, the method further includes: parsing a bitstream, to obtain information about the filter set.

In a feasible implementation of the third aspect, the method is used for an encoder, and before the obtaining a first index of the luma block, the method further includes: selecting a candidate filter set with minimum encoding cost from preset candidate filters set as the filter set; and encoding information about the filter set.

A fourth aspect of the embodiments of the present invention provides an image filtering method, including: partitioning luma pixels of a to-be-processed image into a plurality of luma control blocks based on a first structure, where each luma control block includes one or more adjacent luma pixels; and determining luma filtering identifiers of the to-be-processed image, where the luma filtering identifiers represent whether the luma control blocks in the to-be-processed image are to be filtered.

In a feasible implementation of the fourth aspect, the partitioning luma pixels of a to-be-processed image into a plurality of luma control blocks based on a first structure includes: partitioning the luma pixels of the to-be-processed image into one or more equal-sized first initially partitioned blocks based on a preset size; and performing quadtree or binary-tree partitioning on the first initially partitioned blocks, to obtain the plurality of luma control blocks.

In a feasible implementation of the fourth aspect, the method is used for a decoder, and the determining luma filtering identifiers of the to-be-processed image includes: decoding the bitstream, to obtain information about the luma filtering identifiers.

In a feasible implementation of the fourth aspect, the method is used for an encoder, and the determining luma filtering identifiers of the to-be-processed image includes: selecting candidate luma filtering identifiers with minimum encoding cost from a preset candidate luma filtering identifier set as the luma filtering identifiers.

In a feasible implementation of the fourth aspect, after the determining luma filtering identifiers of the to-be-processed image, the method further includes: encoding information about the luma filtering identifiers.

In a feasible implementation of the fourth aspect, after the determining luma filtering identifiers of the to-be-processed image, the method further includes: determining first chroma filtering identifiers of the to-be-processed image, where the first chroma filtering identifiers represent whether the respective first chroma control blocks in the to-be-processed image are to be filtered, and each first chroma control block includes one or more adjacent first chroma pixels.

In a feasible implementation of the fourth aspect, before the determining first chroma filtering identifiers of the to-be-processed image, the method further includes: partitioning first chroma pixels of the to-be-processed image into a plurality of first chroma control blocks based on the first structure; and correspondingly, the determining first chroma filtering identifiers of the to-be-processed image includes: obtaining the first chroma filtering identifiers by mapping the luma filtering identifiers.

In a feasible implementation of the fourth aspect, before the determining first chroma filtering identifiers of the to-be-processed image, the method further includes: partitioning first chroma pixels of the to-be-processed image into a plurality of first chroma control blocks based on a second structure.

In a feasible implementation of the fourth aspect, the partitioning first chroma pixels of the to-be-processed image into a plurality of first chroma control blocks based on a second structure includes: partitioning the first chroma pixels of the to-be-processed image into one or more equal-sized second initially partitioned blocks based on a preset size; and performing quadtree or binary-tree partitioning on the second initially partitioned blocks, to obtain the plurality of first chroma control blocks.

In a feasible implementation of the fourth aspect, the method is used for the decoder, and the determining first chroma filtering identifiers of the to-be-processed image includes: decoding the bitstream, to obtain information about the first chroma filtering identifiers.

In a feasible implementation of the fourth aspect, the method is used for the encoder, and the determining first chroma filtering identifiers of the to-be-processed image includes: selecting candidate first chroma filtering identifiers with minimum encoding cost from a preset candidate first chroma filtering identifier set as the first chroma filtering identifiers.

In a feasible implementation of the fourth aspect, after the determining first chroma filtering identifiers of the to-be-processed image, the method further includes: encoding information about the first chroma filtering identifiers.

In a feasible implementation of the fourth aspect, after the determining first chroma filtering identifiers of the to-be-processed image, the method further includes: determining second chroma filtering identifiers of the to-be-processed image, where the second chroma filtering identifiers represent whether the respective second chroma control blocks in the to-be-processed image are to be filtered, and each second chroma control block includes one or more adjacent second chroma pixels.

In a feasible implementation of the fourth aspect, before the determining second chroma filtering identifiers of the to-be-processed image, the method further includes: partitioning second chroma pixels of the to-be-processed image into a plurality of second chroma control blocks based on the first structure; and correspondingly, the determining second chroma filtering identifiers of the to-be-processed image includes: obtaining the second chroma filtering identifiers by mapping the luma filtering identifiers.

In a feasible implementation of the fourth aspect, before the determining second chroma filtering identifiers of the to-be-processed image, the method further includes: partitioning second chroma pixels of the to-be-processed image into a plurality of second chroma control blocks based on the second structure; and correspondingly, the determining second chroma filtering identifiers of the to-be-processed image includes: obtaining the second chroma filtering identifiers by mapping the first chroma filtering identifiers.

In a feasible implementation of the fourth aspect, before the determining second chroma filtering identifiers of the to-be-processed image, the method further includes: partitioning second chroma pixels of the to-be-processed image into a plurality of second chroma control blocks based on a third structure.

In a feasible implementation of the fourth aspect, the partitioning second chroma pixels of the to-be-processed image into a plurality of second chroma control blocks based on a third structure includes: partitioning the second chroma pixels of the to-be-processed image into one or more equal-sized third initially partitioned blocks based on a preset size; and performing quadtree or binary-tree partitioning on the third initially partitioned blocks, to obtain the plurality of second chroma control blocks.

In a feasible implementation of the fourth aspect, the method is used for the decoder, and the determining second chroma filtering identifiers of the to-be-processed image includes: decoding the bitstream, to obtain information about the second chroma filtering identifiers.

In a feasible implementation of the fourth aspect, the method is used for the encoder, and the determining second chroma filtering identifiers of the to-be-processed image includes: selecting candidate second chroma filtering identifiers with minimum encoding cost from a preset candidate second chroma filtering identifier set as the second chroma filtering identifiers.

In a feasible implementation of the fourth aspect, after the determining second chroma filtering identifiers of the to-be-processed image, the method further includes: encoding information about the second chroma filtering identifiers.

In a feasible implementation of the fourth aspect, at least two of the first structure, the second structure, and the third structure are the same.

In a feasible implementation of the fourth aspect, the first structure, the second structure, and the third structure are different from each other.

A fifth aspect of the embodiments of the present invention provides an image filtering method, where a to-be-processed image includes a plurality of luma blocks and a plurality of first chroma blocks, each luma block includes a plurality of adjacent luma pixels, each first chroma block includes a plurality of adjacent first chroma pixels, and the method includes: determining a filter set corresponding to the to-be-processed image, where the filter set includes one or more filters, and the one or more filters have a respective filter index; determining a first index of each of the plurality of luma blocks, where the first index represents a category to which the luma blocks belong in a first class, and there is a first relationship between the first index and the filter index; determining a second index of each of the plurality of first chroma blocks, where the second index represents a category to which the first chroma blocks belong in a second class, there is a second relationship between the second index and the filter index, and the first relationship is the same as the second relationship; filtering the plurality of luma blocks by applying a filter corresponding to the first index; and filtering the plurality of first chroma blocks by applying a filter corresponding to the second index.

In a feasible implementation of the fifth aspect, the to-be-processed image further includes a plurality of second chroma blocks, each second chroma block includes a plurality of adjacent second chroma pixels, and after the filtering the plurality of first chroma blocks by applying a filter corresponding to the second index, the method further includes: filtering the plurality of second chroma blocks by using a target filter.

This embodiment of the present invention has the following beneficial effects: After the plurality of first chroma blocks are filtered by applying the filter corresponding to the second index, a target filter may be further determined for the second chroma blocks, and the plurality of second chroma blocks are filtered by using the target filter, so that image filtering accuracy is further improved, and an image distortion rate is reduced.

In a feasible implementation of the fifth aspect, before the filtering the plurality of second chroma blocks by using a target filter, the method further includes: using, as the target filter, the filter corresponding to the second index of the first chroma block in the same image area corresponding to each second chroma block.

This embodiment of the present invention has the following beneficial effects: The second chroma block has no index, and the second index of the first chroma block in the same corresponding image areas is directly reused, so that a bit rate occupied for transmitting an index to a decoder by an encoder is reduced.

In a feasible implementation of the fifth aspect, before the filtering the plurality of second chroma blocks by using a target filter, the method further includes: determining a third index of each of the plurality of second chroma blocks, where the third index represents a category to which the second chroma blocks belong in a third class, there is a third relationship between the third index and the filter index, the first relationship is the same as the third relationship, and the target filter is a filter corresponding to the third index.

This embodiment of the present invention has the following beneficial effects: The third index of each second chroma block can be accurately calculated, and the corresponding second chroma blocks are filtered by using a more appropriate filter, so that filtering accuracy is improved.

In a feasible implementation of the fifth aspect, the method is used for a decoder, and the determining a filter set corresponding to the to-be-processed image includes: decoding a bitstream, where the bitstream includes first information about the filter set; and determining the filter set based on the first information.

In a feasible implementation of the fifth aspect, the method is used for an encoder, and the determining a filter set corresponding to the to-be-processed image includes: selecting a piece of candidate second information with minimum encoding cost from various pieces of preset candidate second information about the filter set as second information about the filter set, and determining the filter set based on the second information.

In a feasible implementation of the fifth aspect, the determining a first index of each of the plurality of luma blocks includes: determining the first index of each luma block based on a first relationship, where the first relationship is determined based on a pixel at a preset location in the luma block and a neighborhood pixel of the pixel at the preset location in the luma block.

In a feasible implementation of the fifth aspect, the first relationship represents texture direction and a variation intensity of an image area corresponding to the luma block.

In a feasible implementation of the fifth aspect, there is a first relationship between the first index and the filter index, including that each first index value is equal to one filter index value; and correspondingly, there is a second relationship between the second index and the filter index, and the first relationship is the same as the second relationship, including that each second index value is equal to one filter index value.

In a feasible implementation of the fifth aspect, the determining a second index of each of the plurality of first chroma blocks includes: determining the second index of each first chroma block based on a second relationship, where the second relationship is determined based on a pixel at a preset location in the first chroma block and a neighborhood pixel of the pixel at the preset location in the first chroma block.

This embodiment of the present invention has the following beneficial effects: The second index of each first chroma block can be accurately calculated, and the corresponding first chroma blocks are filtered by using a more appropriate filter, so that filtering accuracy is improved.

In a feasible implementation of the fifth aspect, the second relationship represents texture direction and a variation intensity of an image area corresponding to the first chroma block.

In a feasible implementation of the fifth aspect, the determining a second index of each of the plurality of first chroma blocks includes: using the first index of the luma block in the same image area corresponding to the first chroma block as the second index.

This embodiment of the present invention has the following beneficial effects: A calculation amount generated by calculating the second index can be avoided, so that calculation load of a digital video apparatus is reduced, and a processing speed is improved.

In a feasible implementation of the fifth aspect, the determining a third index of each of the plurality of second chroma blocks includes: determining the third index of each second chroma block based on a third relationship, where the third relationship is determined based on a pixel at a preset location in the second chroma block and a neighborhood pixel of the pixel at the preset location in the second chroma block.

This embodiment of the present invention has the following beneficial effects: The third index of each second chroma block can be accurately calculated, and the corresponding second chroma blocks are filtered by using a more appropriate filter, so that filtering accuracy is improved.

In a feasible implementation of the fifth aspect, the third relationship represents texture direction and a variation intensity of an image area corresponding to the second chroma block.

In a feasible implementation of the fifth aspect, the determining a third index of each of the plurality of second chroma blocks includes: using the first index of the luma block in the same image area corresponding to the second chroma block as the third index; or using the second index of the first chroma block in the same image area corresponding to the second chroma block as the third index.

This embodiment of the present invention has the following beneficial effects: A calculation amount generated by calculating the third index can be avoided, so that calculation load of a digital video apparatus is reduced, and a processing speed is improved.

In a feasible implementation of the fifth aspect, at least two of the first relationship, the second relationship, and the third relationship are the same.

This embodiment of the present invention has the following beneficial effects: When the first relationship, the second relationship, and the third relationship are the same, the filter used for filtering the first chroma blocks, the filter used for filtering the second chroma blocks, and the filter used for filtering the luma blocks are usually the same. Therefore, a filtering coefficient of the filter for filtering the first chroma blocks and the second chroma blocks does not need to be additionally transferred, so that a bit rate occupied for transferring the filtering coefficient of the filter is reduced.

In a feasible implementation of the fifth aspect, the first relationship, the second relationship, and the third relationship are different from each other.

In a feasible implementation of the fifth aspect, a size of the first chroma block is greater than that of the luma block; and a size of the second chroma block is greater than that of the luma block.

This embodiment of the present invention has the following beneficial effects: Different processing manners may be used based on different image details included in a chroma block and a luma block, so that processing efficiency is improved.

In a feasible implementation of the fifth aspect, before the filtering the plurality of luma blocks by applying a filter corresponding to the first index, the method further includes: partitioning luma pixels of the to-be-processed image into a plurality of luma control blocks based on a first structure, where each luma control block includes one or more adjacent luma pixels; and determining luma filtering identifiers of the to-be-processed image, where the luma filtering identifiers represent whether the respective luma control blocks in the to-be-processed image are to be filtered.

This embodiment of the present invention has the following beneficial effects: Filtering different areas of an image is controlled independently, so that applicability of the filtering method is improved.

In a feasible implementation of the fifth aspect, the partitioning luma pixels of the to-be-processed image into a plurality of luma control blocks based on a first structure includes: partitioning the luma pixels of the to-be-processed image into one or more equal-sized first initially partitioned blocks based on a preset size; and performing quadtree or binary-tree partitioning on the first initially partitioned blocks, to obtain the plurality of luma control blocks.

This embodiment of the present invention has the following beneficial effects: Image area partitioning is more flexible, and this better facilitates regional filtering.

In a feasible implementation of the fifth aspect, the method is used for the decoder, and the determining luma filtering identifiers of the to-be-processed image includes: decoding the bitstream, to obtain the luma filtering identifiers.

In a feasible implementation of the fifth aspect, the method is used for the encoder, and the determining luma filtering identifiers of the to-be-processed image includes: selecting candidate luma filtering identifiers with minimum encoding cost from a plurality of preset candidate luma filtering identifiers as the luma filtering identifiers of the to-be-processed image.

In a feasible implementation of the fifth aspect, after the determining luma filtering identifiers of the to-be-processed image, the method further includes: determining first chroma filtering identifiers of the to-be-processed image, where the first chroma filtering identifiers represent whether the respective first chroma control blocks in the to-be-processed image are to be filtered, and each first chroma control block includes one or more adjacent first chroma pixels.

This embodiment of the present invention has the following beneficial effects: Filtering different areas of an image is controlled independently, so that applicability of the filtering method is improved.

In a feasible implementation of the fifth aspect, before the determining first chroma filtering identifiers of the to-be-processed image, the method further includes: partitioning first chroma pixels of the to-be-processed image into a plurality of first chroma control blocks based on the first structure; and correspondingly, the determining first chroma filtering identifiers of the to-be-processed image includes: obtaining the first chroma filtering identifiers by mapping the luma filtering identifiers.

This embodiment of the present invention has the following beneficial effects: Partitioning the luma pixels and partitioning the first chroma pixels can be implemented more easily. In addition, the luma filtering identifiers of the luma control blocks are associated with the first chroma filtering identifiers of the first chroma control blocks, so that filtering identifier setting can be simplified, and a bit rate occupied for transmitting filtering identifiers to a decoder by an encoder can also be reduced.

In a feasible implementation of the fifth aspect, before the determining first chroma filtering identifiers of the to-be-processed image, the method further includes: partitioning first chroma pixels of the to-be-processed image into a plurality of first chroma control blocks based on a second structure.

This embodiment of the present invention has the following beneficial effects: According to this implementation, the luma pixels and the first chroma pixels can be partitioned based on different structures depending on an actual requirement, so that freedom of filtering control is improved, and filtering accuracy is improved. In addition, the luma filtering identifiers of the luma control blocks and the first chroma filtering identifiers of the first chroma control blocks each are independently set, so that the freedom of filtering control can be further improved, and the filtering accuracy is also further improved.

In a feasible implementation of the fifth aspect, the partitioning first chroma pixels of the to-be-processed image into a plurality of first chroma control blocks based on a second structure includes: partitioning the first chroma pixels of the to-be-processed image into one or more equal-sized second initially partitioned blocks based on a preset size; and performing quadtree or binary-tree partitioning on the second initially partitioned blocks, to obtain the plurality of first chroma control blocks.

In a feasible implementation of the fifth aspect, the method is used for the decoder, and the determining first chroma filtering identifiers of the to-be-processed image includes: decoding the bitstream, to obtain the first chroma filtering identifiers.

In a feasible implementation of the fifth aspect, the method is used for the encoder, and the determining first chroma filtering identifiers of the to-be-processed image includes: selecting candidate first chroma filtering identifiers with minimum encoding cost from a plurality of preset candidate first chroma filtering identifiers as the first chroma filtering identifiers of the to-be-processed image.

In a feasible implementation of the fifth aspect, after the determining first chroma filtering identifiers of the to-be-processed image, the method further includes: determining second chroma filtering identifiers of the to-be-processed image, where the second chroma filtering identifiers represent whether the respective second chroma control blocks in the to-be-processed image are to be filtered, and each second chroma control block includes one or more adjacent second chroma pixels.

This embodiment of the present invention has the following beneficial effects: After the first chroma filtering identifiers of the to-be-processed image are determined, second chroma pixels of the to-be-processed image may be further partitioned into a plurality of second chroma control blocks, and then the second chroma filtering identifiers of the to-be-processed image are determined, to determine whether to filter the second chroma control blocks of the to-be-processed image, so that image filtering accuracy is further improved, and an image distortion rate is reduced.

In a feasible implementation of the fifth aspect, before the determining second chroma filtering identifiers of the to-be-processed image, the method further includes: partitioning second chroma pixels of the to-be-processed image into a plurality of second chroma control blocks based on the first structure; and correspondingly, the determining second chroma filtering identifiers of the to-be-processed image includes: obtaining the second chroma filtering identifiers by mapping the luma filtering identifiers.

This embodiment of the present invention has the following beneficial effects: Partitioning the luma pixels and partitioning the second chroma pixels can be implemented more easily. In addition, the luma filtering identifiers of the luma control blocks are associated with the second chroma filtering identifiers of the second chroma control blocks, so that filtering identifier setting can be simplified, and a bit rate occupied for transmitting filtering identifiers to a decoder by an encoder can also be reduced.

In a feasible implementation of the fifth aspect, before the determining second chroma filtering identifiers of the to-be-processed image, the method further includes: partitioning second chroma pixels of the to-be-processed image into a plurality of second chroma control blocks based on the second structure; and correspondingly, the determining second chroma filtering identifiers of the to-be-processed image includes: obtaining the second chroma filtering identifiers by mapping the first chroma filtering identifiers.

This embodiment of the present invention has the following beneficial effects: Partitioning the first chroma pixels and partitioning the second chroma pixels can be implemented more easily. In addition, the first chroma filtering identifiers of the first chroma control blocks are associated with the second chroma filtering identifiers of the second chroma control blocks, so that filtering identifier setting can be simplified, and a bit rate occupied for transmitting filtering identifiers to a decoder by an encoder can also be reduced.

In a feasible implementation of the fifth aspect, before the determining second chroma filtering identifiers of the to-be-processed image, the method further includes: partitioning second chroma pixels of the to-be-processed image into a plurality of second chroma control blocks based on a third structure.

In a feasible implementation of the fifth aspect, the partitioning second chroma pixels of the to-be-processed image into a plurality of second chroma control blocks based on a third structure includes: partitioning the second chroma pixels of the to-be-processed image into one or more equal-sized third initially partitioned blocks based on a preset size; and performing quadtree or binary-tree partitioning on the third initially partitioned blocks, to obtain the plurality of second chroma control blocks.

In a feasible implementation of the fifth aspect, the method is used for the decoder, and the determining second chroma filtering identifiers of the to-be-processed image includes: decoding the bitstream, to obtain the second chroma filtering identifiers.

In a feasible implementation of the fifth aspect, the method is used for the encoder, and the determining second chroma filtering identifiers of the to-be-processed image includes: selecting candidate second chroma filtering identifiers with minimum encoding cost from a plurality of preset candidate second chroma filtering identifiers as the second chroma filtering identifiers of the to-be-processed image.

In a feasible implementation of the fifth aspect, at least two of the first structure, the second structure, and the third structure are the same.

In a feasible implementation of the fifth aspect, the first structure, the second structure, and the third structure are different from each other.

In a feasible implementation of the fifth aspect, a minimum partitioning unit of the first structure is the luma block, a minimum partitioning unit of the second structure is the first chroma block, and a minimum partitioning unit of the third structure is the second chroma block.

This embodiment of the present invention has the following beneficial effects: A minimum control unit of a filtered area is consistent with a minimum filtering processing unit, so that logical judgment during processing is reduced, and processing efficiency is improved.

A sixth aspect of the embodiments of the present invention provides a codec. The codec includes a processor and a memory. The processor is connected to the memory. The memory is configured to store program code for implementing the method in the first aspect, the third aspect, the fourth aspect, or the fifth aspect, and the processor is configured to execute the program code stored in the memory, that is, perform the method in the first aspect, the third aspect, the fourth aspect, or the fifth aspect.

A seventh aspect of the embodiments of the present invention provides a computer storage medium, configured to store a computer software instruction for implementing the method in the first aspect, the third aspect, the fourth aspect, or the fifth aspect, and the instruction includes code for performing the method in the first aspect, the third aspect, the fourth aspect, or the fifth aspect.

It should be understood that, technical solutions of the second aspect to the seventh aspect of the embodiments of the present invention are consistent with those of the first aspect of the embodiments of the present invention, and obtained beneficial effects are similar. Details are not described again.

It can be learned from the foregoing technical solutions that, the embodiments of the present invention provide an image filtering method and apparatus, so that image filtering accuracy can be improved, an image distortion rate can be reduced, and a bit rate occupied for transmitting a filtering coefficient can be reduced.

BRIEF DESCRIPTION OF DRAWINGS

To describe the technical solutions in the embodiments of the present invention more clearly, the following briefly describes the accompanying drawings required for the embodiments.

FIG. 20 is a schematic diagram of first chroma filtering identifiers of first chroma control blocks obtained through partitioning by using a second structure according to an embodiment of the present invention;

FIG. 21 is a schematic diagram of one type of first chroma filtering identifiers of first chroma control blocks obtained through partitioning by using a first structure according to an embodiment of the present invention;

FIG. 22 is a schematic diagram of another type of first chroma filtering identifiers of first chroma control blocks obtained through partitioning by using a first structure according to an embodiment of the present invention;

FIG. 23 is a schematic diagram of obtaining second chroma control blocks through partitioning by using a first structure according to an embodiment of the present invention;

FIG. 24 is a schematic diagram of one type of second chroma filtering identifiers of second chroma control blocks obtained through partitioning by using a first structure according to an embodiment of the present invention;

FIG. 25 is a schematic diagram of another type of second chroma filtering identifiers of second chroma control blocks obtained through partitioning by using a first structure according to an embodiment of the present invention;

FIG. 26 is a schematic diagram of obtaining second chroma control blocks through partitioning by using a second structure according to an embodiment of the present invention;

FIG. 27 is a schematic diagram of one type of second chroma filtering identifiers of second chroma control blocks obtained through partitioning by using a second structure according to an embodiment of the present invention;

DESCRIPTION OF EMBODIMENTS

The following clearly describes the technical solutions in the embodiments of the present invention in detail with reference to the accompanying drawings in the embodiments of the present invention.

For ease of understanding the embodiments of the present invention, a YCbCr model, a luma block, a first chroma block, and a second chroma block in the embodiments of the present invention are first described.

The YCbCr model is a subjectively defined colorful model (and is also referred to as color space in some occasions). The YCbCr model includes three components (Y, Cb, Cr), where Y is a luma component, Cb is a first chroma component, and Cr is a second chroma component (certainly, Cr may alternatively be a first chroma component, and Cb may alternatively be a second chroma component). The first chroma component and the second chroma component may be collectively referred to as a chroma component. Correspondingly, for a YCbCr model-based image, each pixel in the image includes a luma pixel, a first chroma pixel, and a second chroma pixel. The first chroma pixel and the second chroma pixel may be collectively referred to as a chroma pixel.

Figure 1:
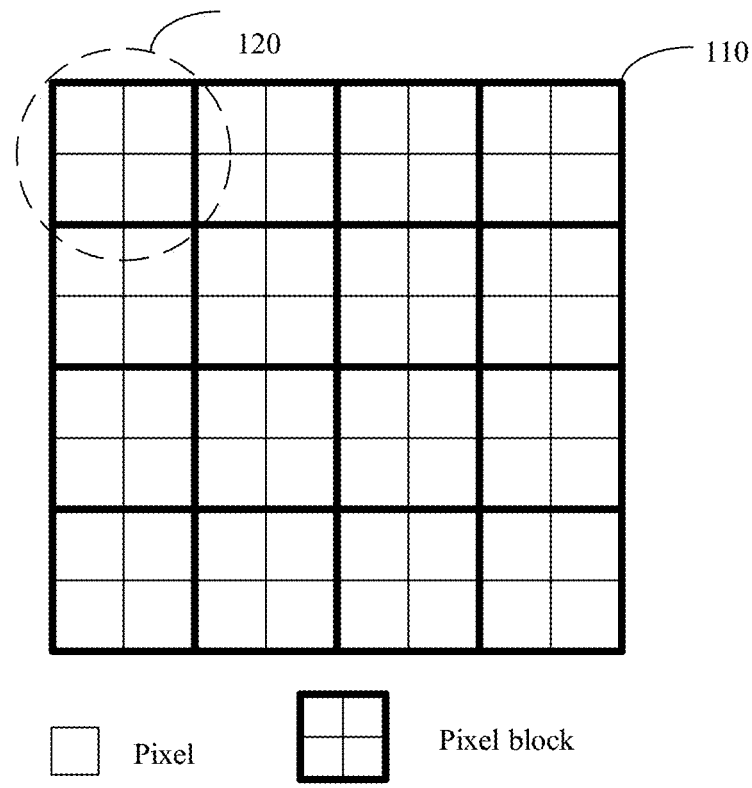
FIG. 1 is a schematic diagram of image block partitioning in the embodiments of the present invention.

To improve image processing efficiency, block partitioning is usually performed on an image. As shown in FIG. 1, pixels of an image 110 may be partitioned into a plurality of pixel blocks 120 (as shown in a dashed round frame in the figure), where each pixel block 120 includes a plurality of adjacent pixels. For example, the pixel blocks 120 may be adjacent pixel blocks in a size of 2×2, 2×3, or 3×3. It can be understood that, when only luma pixels are considered, the pixel blocks 120 are luma blocks, when only first chroma pixels are considered, the pixel blocks 120 are first chroma blocks, and when only second chroma pixels are considered, the pixel blocks 120 are second chroma blocks.

Figure 2:
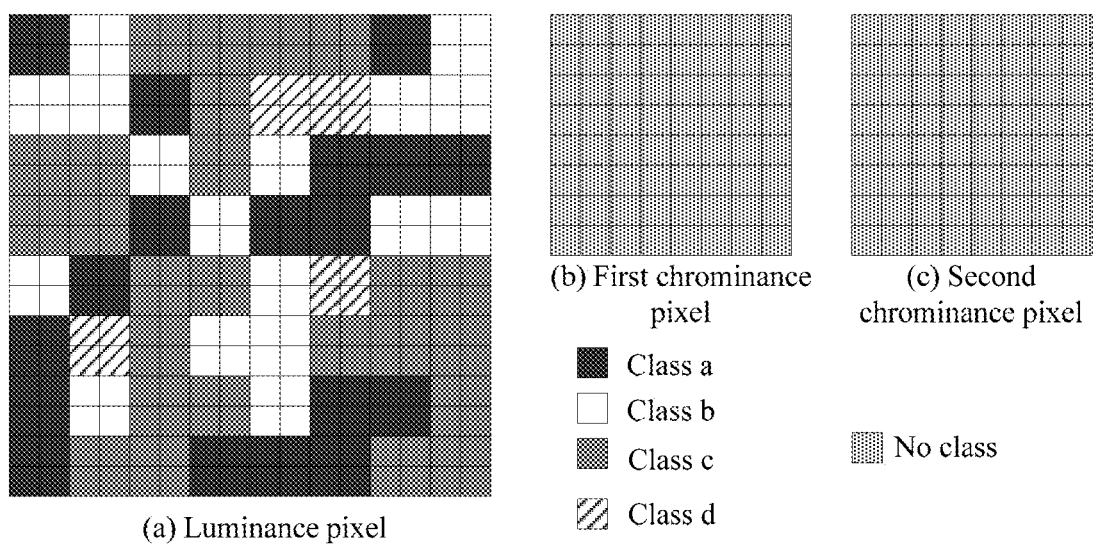
FIG. 2 is a schematic diagram of classification-based luma pixel filtering and non-classification-based chroma pixel filtering in the conventional way.

To resolve a problem that block partitioning inevitably causes image distortion, the prior art provides an image filtering method. According to the image filtering method, luma pixels and chroma pixels are filtered separately. Specifically, as shown in FIG. 2, for the luma pixels, according to the image filtering method, luma blocks in an image are classified into a plurality of classes (a class a to a class d in the figure), and luma blocks of a same class are filtered by using a same filter. However, for the chroma pixels (including first chroma pixels and second chroma pixels), according to the filtering method, all chroma blocks in the image are filtered by using one filter. In other words, according to the image filtering method, classification-based filtering is performed on the luma pixels, but not on the chroma pixels. In addition, according to the image filtering method, the filter used for filtering the luma pixels is different from the filter used for filtering the chroma pixels.

It can be understood that, according to the image filtering method in the prior art, all chroma blocks in an image are filtered by using a same filter, and consequently, filtering accuracy of the filter on the image is not high, and an image distortion rate after filtering is still excessively great.

In addition, according to the image filtering method, the filter used for filtering the luma pixels is different from the filter used for filtering the chroma pixels, and different filters are corresponding to different filtering coefficients. Therefore, a filtering coefficient of the filter used for filtering the luma pixels and a filtering coefficient of the filter used for filtering the chroma pixels need to be transmitted to a decoder separately. As a result, a bit rate occupied for transmitting the filtering coefficients is increased.

For the existing technical problem, the embodiments of the present invention provide an image filtering method and apparatus, so that image filtering accuracy can be improved, an image distortion rate can be reduced, and a bit rate occupied for transmitting a filtering coefficient can be reduced. The following provides description separately.

Figure 3:
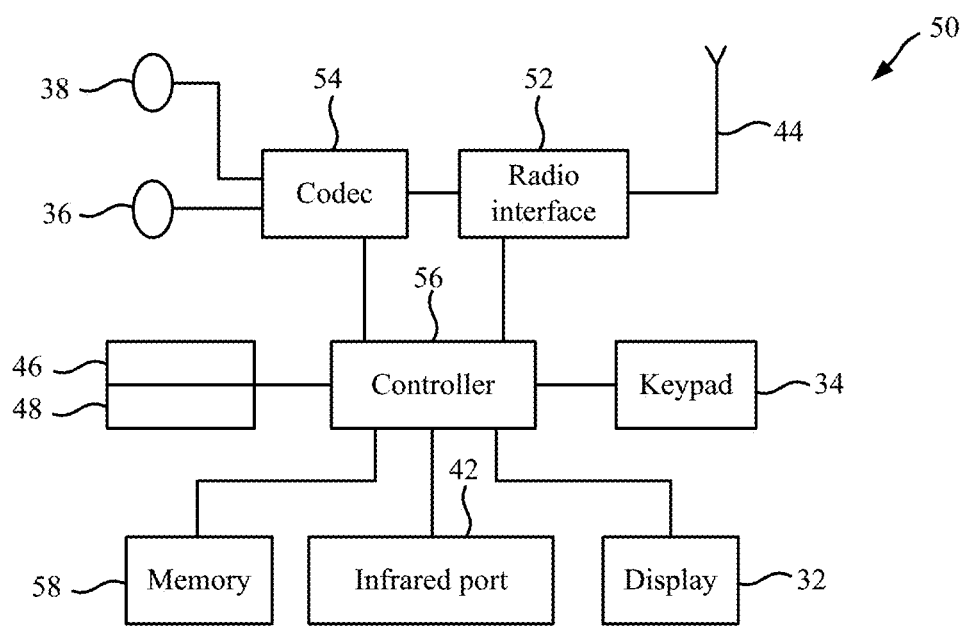
FIG. 3 is a schematic block diagram of a video encoding/decoding apparatus 50 or an electronic device 50 according to an embodiment of the present invention.
Figure 4:
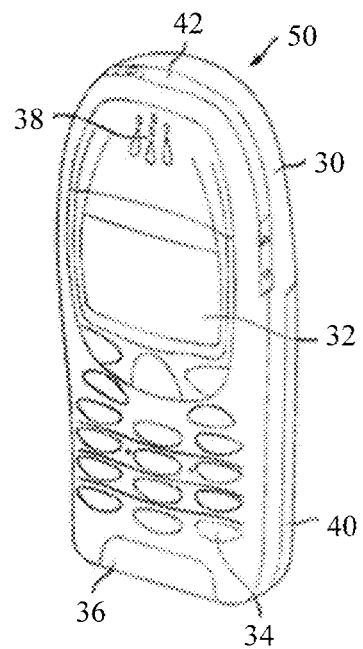
FIG. 4 is a schematic diagram of an apparatus for video encoding according to an embodiment of the present invention.

For ease of understanding, a digital video apparatus in the present invention is described first. The digital video apparatus may include a video encoding/decoding apparatus 50 or an electronic device 50. FIG. 3 is a schematic block diagram of the video encoding/decoding apparatus 50 or the electronic device 50. The apparatus or the electronic device may be incorporated into a codec provided in the embodiments of the present invention. The codec in the embodiments of the present invention can perform an image filtering method shown in FIG. 6, an image block-partitioning control method shown in FIG. 14, and an image filtering method that combines the image filtering method shown in FIG. 6 and the image block-partitioning control method shown in FIG. 14. For details, refer to the following description, and no specific description is provided herein. FIG. 4 is a schematic diagram of an apparatus for video encoding according to an embodiment of the present invention. Units in FIG. 3 and FIG. 4 are described below.

The electronic device 50 may be, for example, a mobile terminal or user equipment of a wireless communications system. It should be understood that, the embodiments of the present invention may be implemented within any electronic device or apparatus that may need to perform encoding and decoding, or encoding, or decoding on video images.

The apparatus 50 may include a housing 30 for being incorporated into and protecting the device. The apparatus 50 may further include a display 32 in the form of a liquid crystal display. In another embodiment of the present invention, the display may be any appropriate display technology suitable for displaying an image or a video. The apparatus 50 may further include a keypad 34. In another embodiment of the present invention, any appropriate data or user interface mechanism may be used. For example, a user interface may be implemented as a virtual keyboard or a data entry system as a part of a touch-sensitive display. The apparatus may include a microphone 36 or any appropriate audio input that may be a digital or analog signal input. The apparatus 50 may further include an audio output device, and in the embodiments of the present invention, the audio output device may be any one of an earpiece 38, a speaker, or an analog audio or digital audio output connection. The apparatus 50 may also include a battery 40, and in another embodiment of the present invention, the device may be powered by any appropriate mobile energy device such as a solar cell, a fuel cell, or a clockwork generator. The apparatus may further include an infrared port 42 for short range line of sight communication with another device. In another embodiment, the apparatus 50 may further include any appropriate short range communication solution such as a Bluetooth wireless connection or a USB/firewire wired connection.

The apparatus 50 may include a controller 56 or a processor for controlling the apparatus 50. The controller 56 may be connected to a memory 58, and in the embodiments of the present invention, the memory may store data in an image form and data in an audio form and/or may also store an instruction for implementation on the controller 56. The controller 56 may be further connected to a codec circuit 54 suitable for implementing encoding and decoding of audio and/or video data or assisting in encoding and decoding implemented by the controller 56.

The apparatus 50 may further include a card reader 48 and a smart card 46, for example, a UICC and a UICC reader, for providing user information and being suitable for providing authentication information for authentication and authorization of a user at a network.

The apparatus 50 may further include a radio interface circuit 52, and the radio interface circuit is connected to the controller and suitable for generating wireless communication signals, for example, for communication with a cellular communications network, a wireless communications system, or a wireless local area network. The apparatus 50 may further include an antenna 44, and the antenna is connected to the radio interface circuit 52 for sending radio frequency signals generated at the radio interface circuit 52 to (a plurality of) other apparatuses and for receiving radio frequency signals from (a plurality of) other apparatuses.

In some embodiments of the present invention, the apparatus 50 includes a camera capable of recording or detecting individual frames that are then passed to the codec 54 or the controller for processing. In some embodiments of the present invention, the apparatus may receive to-be-processed video image data from another device prior to transmission and/or storage. In some embodiments of the present invention, the apparatus 50 may receive, by using a wireless or wired connection, an image for encoding/decoding.

Figure 5:
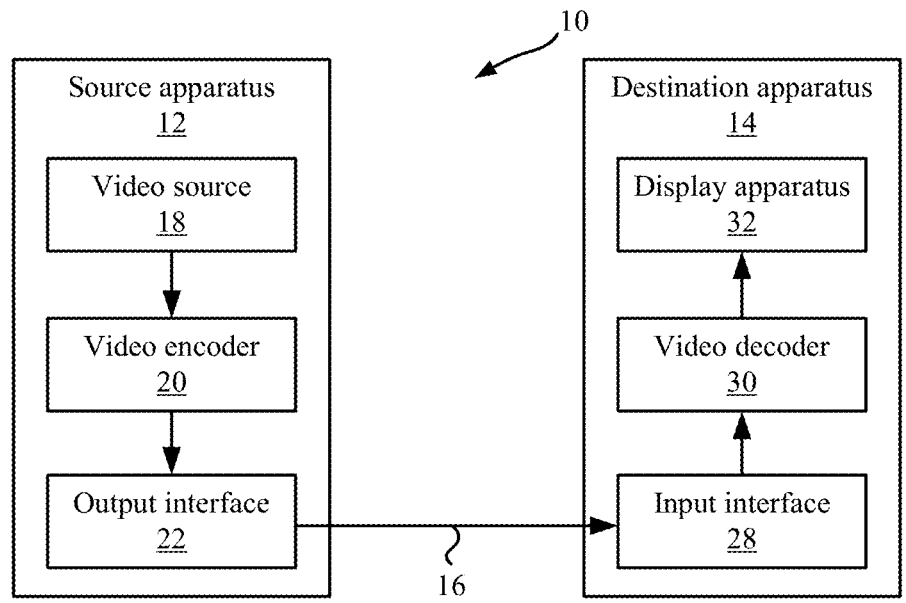
FIG. 5 is a schematic block diagram of another video encoding/decoding system according to an embodiment of the present invention.

FIG. 5 is a schematic block diagram of another video encoding/decoding system 10 according to an embodiment of the present invention. As shown in FIG. 5, the video encoding/decoding system 10 includes a source apparatus 12 and a destination apparatus 14. The source apparatus 12 generates encoded video data. Therefore, the source apparatus 12 may be referred to as a video encoding apparatus or a video encoding device. The destination apparatus 14 may decode the encoded video data generated by the source apparatus 12. Therefore, the destination apparatus 14 may be referred to as a video decoding apparatus or a video decoding device. The source apparatus 12 and the destination apparatus 14 may be examples of a video encoding/decoding apparatus or a video encoding/decoding device. The source apparatus 12 and the destination apparatus 14 may include a wide range of apparatuses, including a desktop computer, a mobile computer apparatus, a notebook (such as laptop) computer, a tablet computer, a set top box, a handheld device such as a smartphone, a television, a camera, a display apparatus, a digital media player, a video game console, an in-vehicle computer, or the like.

The destination apparatus 14 may receive, by using a channel 16, the encoded video data from the source apparatus 12. The channel 16 may include one or more media and/or apparatuses that can move the encoded video data from the source apparatus 12 to the destination apparatus 14. In an example, the channel 16 may include one or more communications media that make the source apparatus 12 be capable of directly transmitting the encoded video data to the destination apparatus 14 in real time. In this example, the source apparatus 12 may modulate the encoded video data according to a communications standard (such as a wireless communications protocol), and may transmit modulated video data to the destination apparatus 14. The one or more communications media may include a wireless and/or wired communications medium, such as a radio frequency (RF) spectrum or one or more physical transmission lines. The one or more communications media may form a part of a packet-based network (such as a local area network, a wide area network, or a global network (such as the Internet)). The one or more communications media may include a router, a switch, a base station, or another device that facilitates communication from the source apparatus 12 to the destination apparatus 14.

In another example, the channel 16 may include a storage medium that stores the encoded video data generated by the source apparatus 12. In this example, the destination apparatus 14 may access the storage medium through a magnetic disk or a card. The storage medium may include a plurality of types of local access data storage media, such as a Blu-ray disc, a DVD, a CD-ROM, a flash memory, or another appropriate digital storage medium that is configured to store the encoded video data.

In another example, the channel 16 may include a file server or another intermediate storage apparatus that stores the encoded video data generated by the source apparatus 12. In this example, the destination apparatus 14 may access, through streaming transmission or downloading, the encoded video data that is stored in the file server or the another intermediate storage apparatus. The file server may be a type of server that can store the encoded video data and transmit the encoded video data to the destination apparatus 14. Examples of the file server include a web server (for example, a web server used for a website), a File Transfer Protocol (FTP) server, a network-attached storage (NAS) apparatus, and a local disk drive.

The destination apparatus 14 may access the encoded video data by using a standard data connection (such as an Internet connection). An example type of data connection includes a wireless channel (such as a Wi-Fi connection), a wired connection (such as a DSL or a cable modem), or a combination of both that is suitable for accessing the encoded video data stored in the file server. The encoded video data may be transmitted from the file server through streaming transmission, downloading transmission, or a combination of both.

The technologies in the present invention are not limited to wireless application scenarios. For example, the technologies may be applied to support video encoding/decoding for a plurality of multimedia applications such as the following applications: over-the-air television broadcasting, cable television transmission, satellite television transmission, streaming transmission video transmission (for example, by using the Internet), encoding for video data that is stored in a data storage medium, decoding for video data that is stored in a data storage medium, or another application. In some examples, the video encoding/decoding system 10 may be configured to support one-way or two-way video transmission, to support applications such as video streaming transmission, video playback, video broadcasting, and/or a video call.

In the example of FIG. 5, the source apparatus 12 includes a video source 18, a video encoder 20, and an output interface 22. In some examples, the output interface 22 may include a modulator/demodulator (modem) and/or a transmitter. The video source 18 may include a video capture apparatus (such as a video camera), a video archive containing previously captured video data, a video input interface configured to receive video data from a video content provider, and/or a computer graphics system configured to generate video data, or a combination of the foregoing video data sources.

The video encoder 20 may encode video data from the video source 18. In some examples, the source apparatus 12 directly transmits the encoded video data to the destination apparatus 14 by using the output interface 22. The encoded video data may be further stored in the storage medium or the file server, so as to be accessed by the destination apparatus 14 later for decoding and/or playback.

In the example of FIG. 5, the destination apparatus 14 includes an input interface 28, a video decoder 30, and a display apparatus 32. In some examples, the input interface 28 includes a receiver and/or a modem. The input interface 28 may receive the encoded video data by using the channel 16. The display apparatus 32 may be integrated into the destination apparatus 14 or may be disposed outside the destination apparatus 14. Generally, the display apparatus 32 displays decoded video data. The display apparatus 32 may include a plurality of display apparatuses, such as a liquid crystal display (LCD), a plasma display, an organic light emitting diode (OLED) display, or another type of display apparatus.

The video encoder 20 and the video decoder 30 may perform an operation according to a video compression standard (such as the High Efficiency Video Coding H.265 standard) and may conform to an HEVC testing model (HM). Text description ITU-TH.265(V3)(04/2015) of the H.265 standard is published on Apr. 29, 2015, and may be downloaded from http://handle.itu.int/11.1002/1000/12455. The file is incorporated herein by reference in its entirety.

Figure 6:
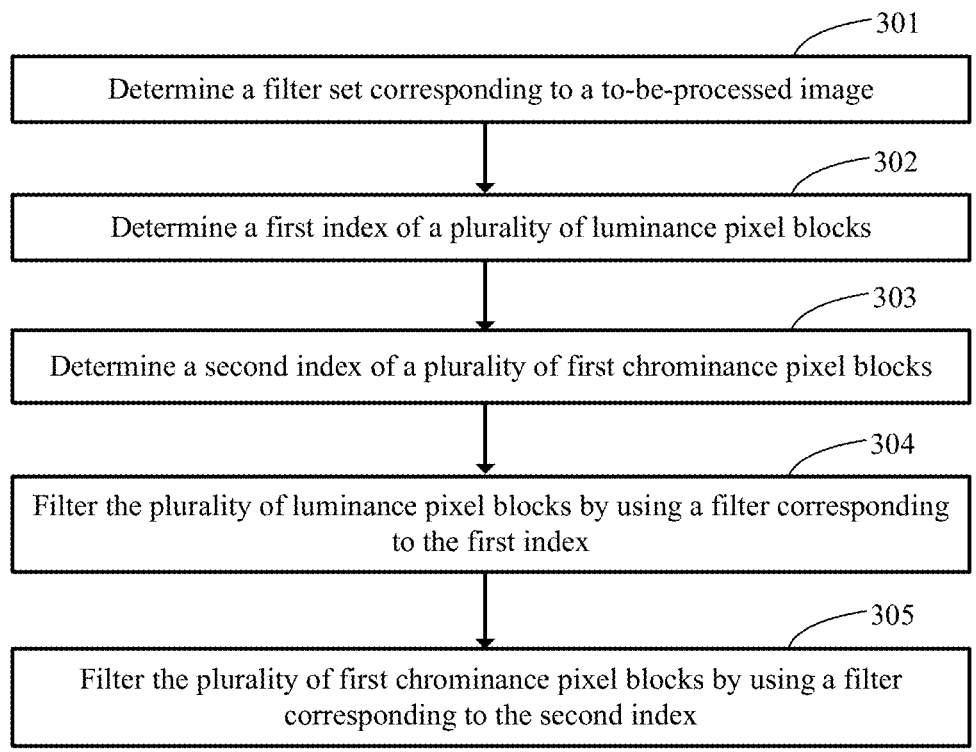
FIG. 6 is a schematic flowchart of an image filtering method according to an embodiment of the present invention.

FIG. 6 is a schematic flowchart of an image filtering method according to an embodiment of the present invention. As shown in FIG. 6, the image filtering method in this embodiment of the present invention includes the following steps.

301. Determine a filter set corresponding to a to-be-processed image, where the filter set includes one or more filters, and the one or more filters have a respective filter index.

In this embodiment of the present invention, the to-be-processed image includes a plurality of luma blocks, a plurality of first chroma blocks, and a plurality of second chroma blocks, each luma block includes a plurality of adjacent luma pixels, each first chroma block includes a plurality of adjacent first chroma pixels, and the second chroma block includes a plurality of adjacent second chroma pixels. A size of the luma block and a size of the first chroma block may be the same or different, and the size of the luma block and a size of the second chroma block may be the same or different. Generally, image texture reflected by the first chroma block and the second chroma block changes more smoothly than that reflected by the luma block, and has fewer details. Therefore, it may be assumed that the size of the first chroma block is greater than the size of the luma block, and that the size of the second chroma block is greater than the size of the luma block. For example, the size of the first chroma block is 4×4, the size of the second chroma block is 4×4, and the size of the luma block is 2×2.

If the image filtering method in this embodiment of the present invention is applied to a decoder, the determining a filter set corresponding to the to-be-processed image is specifically: receiving a bitstream sent by an encoder, decoding the bitstream, to obtain first information in the bitstream, and determining, based on the first information, the filter set corresponding to the to-be-processed image.

If the image filtering method in this embodiment of the present invention is applied to an encoder, the determining a filter set corresponding to the to-be-processed image is specifically: selecting a piece of candidate second information with minimum encoding cost from a plurality of pieces of preset candidate second information about the filter set as second information about the filter set, and determining, based on the second information, the filter set corresponding to the to-be-processed image.

It can be understood that, a sampling format of luma pixels, first chroma pixels, and second chroma pixels may be 4:2:0. To be specific, every 2×2 sampling locations of luma pixels are corresponding to one sampling location of first chroma pixels and one sampling location of second chroma pixels. A sampling format of luma pixels, first chroma pixels, and second chroma pixels may be 4:4:4. To be specific, each sampling location of luma pixels is corresponding to one sampling location of first chroma pixels and one sampling location of second chroma pixels. The sampling format of 4:2:0 is used as an example in the following description.

302. Determine a first index of each of a plurality of luma blocks, where the first index represents a category to which the luma blocks belong in a first class, and there is a first correspondence between the first index and the filter index.

Figure 7:
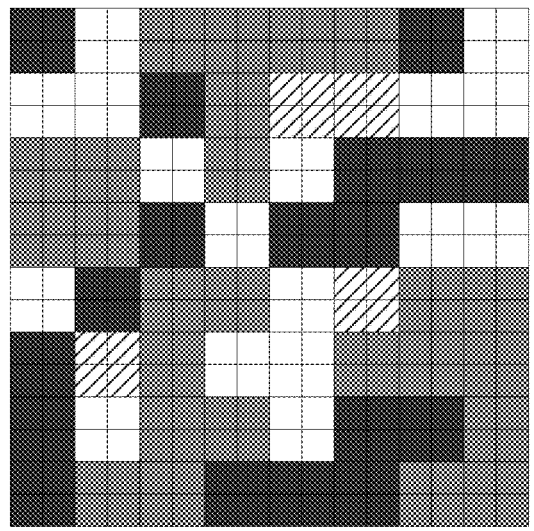
FIG. 7 is a schematic diagram of a correspondence between a first index and a luma block according to an embodiment of the present invention.

In this embodiment of the present invention, the first index represents the category to which the luma blocks belong in the first class. In other words, same first index values indicate that corresponding luma blocks are of a same category, and different first index values indicate that corresponding luma blocks are of different categories. For example, as shown in FIG. 7, a first index value "0" in FIG. 7(a) is corresponding to a luma block of a category a in FIG. 7(b), a first index value "1" in FIG. 7(a) is corresponding to a luma block of a category b in FIG. 7(b), a first index value "2" in FIG. 7(a) is corresponding to a luma block of a category c in FIG. 7(b), and a first index value "3" in FIG. 7(a) is corresponding to a luma block of a category d in FIG. 7(b). The example is used only for explaining this embodiment of the present invention, and should not constitute a limitation. In the foregoing example, a value range of the first index is [0, 3], and in another embodiment, the value range of the first index may be [0, 24] or another range. This is not specifically limited in the present invention.

In this embodiment of the present invention, the filter index is used to distinguish between different filters. In other words, when filter index values are different, corresponding filters are also different. Different filters differ in at least one of a tap and a filtering coefficient.

In this embodiment of the present invention, there is the first correspondence between the first index and the filter index. In other words, when first index values are the same, corresponding filter index values are also the same; and when first index values are different, corresponding filter index values are also different. In a specific embodiment, each first index value is equal to one filter index value. In other words, when first index values are the same, corresponding filters are also the same; and when first index values are different, corresponding filters are also different. Therefore, if a first index value is determined, a corresponding filter is also determined.

In this embodiment of the present invention, a digital video apparatus may determine the first index of each of the plurality of luma blocks based on a first relationship, where the first relationship represents texture direction and a variation intensity of an image area corresponding to the luma block. For example, the first index of each of the plurality of luma blocks may be determined based on C=5D+Â, where C is the first index of the luma block, D is the texture direction of the image area corresponding to the luma block, and Â is the variation intensity of the image area corresponding to the luma block.

Figure 8:
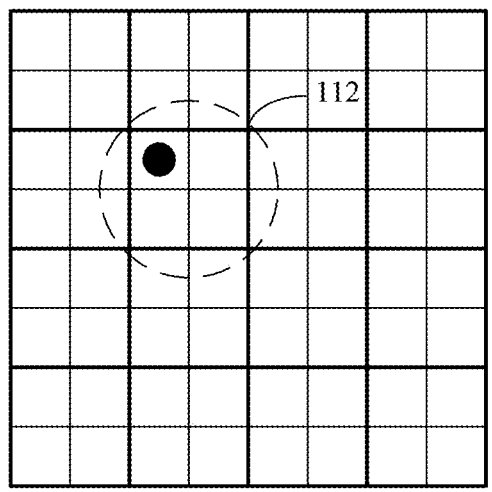
FIG. 8 is a schematic diagram of two manners of determining a preset pixel according to an embodiment of the present invention.
Figure 8:
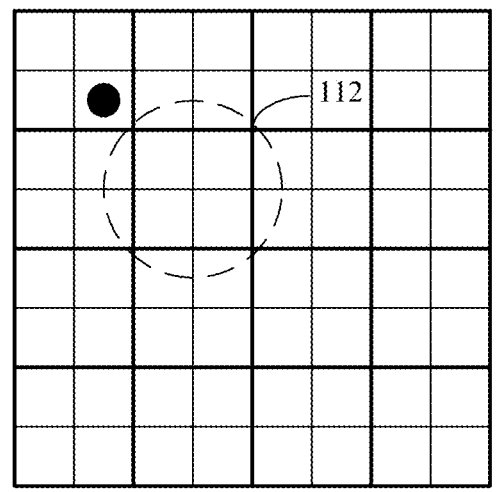

In a specific embodiment, the texture direction D of the image area corresponding to the luma block and the variation intensity Â of the image area corresponding to the luma block may be determined based on a pixel at a preset location in the luma block and a neighborhood pixel of the pixel at the preset location in the luma block. The pixel at the preset location may be a pixel at any location of the luma blocks. For example, as shown in FIG. 8(a), the pixel at the preset location is a pixel in an upper left corner of a luma block 112 (a block in a dashed round frame in the figure). The pixel at the preset location may alternatively be a pixel near a luma block, that is, a point (that is, a pixel with a black point in the figure) whose distance from any luma pixel in the luma block is less than a distance threshold. For example, as shown in FIG. 8(b), the pixel at the preset location is a pixel (that is, a pixel with a black point in the figure) at an upper left corner of a pixel in an upper left corner of a luma block 112 (a block in a dashed round frame in the figure). The neighborhood pixel of the pixel at the preset location may be a four-point neighborhood pixel or an eight-point neighborhood pixel of the pixel at the preset location, or the like. The example is used only for explaining this embodiment of the present invention, and should not constitute a limitation.

Specifically, the texture direction D of an image area corresponding to a luma block may be calculated according to the following steps.

(1) First calculate a horizontal direction gradient $g_h$, a vertical direction gradient $g_v$, and two diagonal direction gradients $g_{d1}$ and $g_{d2}$ of the image area corresponding to the luma block:

$$g_h = \sum_{k=i-a}^{i+b} \sum_{l=j-a}^{j+b} H_{k,l},$$

where $H_{k,l} = |2R(k, l) - R(k-1, l) - R(k+1, l)|$;

-continued $$g_v = \sum_{k=i-a}^{i+b} \sum_{l=j-a}^{j+b} V_{k,l},$$

where $V_{k,l} = |2R(k, l) - R(k, l-1) - R(k, l+1)|$;

$$g_{d1} = \sum_{k=i-a}^{i+b} \sum_{l=j-a}^{j+b} D1_{k,l},$$

where $D1_{k,l} = |2R(k, l) - R(k-1, l-1) - R(k+1, l+1)|$; and $$g_{d2} = \sum_{k=i-a}^{i+b} \sum_{l=j-a}^{j+b} D2_{k,l},$$

where $D2_{k,l} = |2R(k, l) - R(k-1, l+1) - R(k+1, l+1)|$, where

R(k,l) is coordinates of the pixel at the preset location in the luma block, k is a horizontal coordinate of the pixel at the preset location, l is a vertical coordinate of the pixel at the preset location R(k−1,l) R(k+1,l) R(k,l−1) R(k,l+1) R(k−1,l−1), R(k+1,l+1) R(k−1,l+1) and R(k+1,l−1) are eight neighborhood pixels of the pixel R(k,l) at the preset location, i, j, a, and b are all integers, i−a≤k≤i+b, and j−a≤l≤j+b.

(2) Calculate a maximum value $g_{h,v}^{max}$ and a minimum value $g_{h,v}^{min}$ of the horizontal direction gradient and the vertical direction gradient:

$g_{h,v}^{max} = \max(g_h, g_v)$, and $g_{h,v}^{min} = \min(g_h, g_v)$.

(3) Calculate a maximum value $g_{d0,d1}^{max}$ a minimum value $g_{d0,d1}^{min}$ of the two diagonal direction gradients:

$g_{d0,d1}^{max} = \max(g_{d0}, g_{d1})$, and $g_{d0,d1}^{min} = \min(g_{d0}, g_{d1})$ (4) Determine two thresholds t1 and t2, and compare maximum and minimum values of the gradients in the following manner, to determine the directivity D:

if $g_{h,v}^{max} \leq t_1 \cdot g_{h,v}^{min}$, and $g_{d0,d1}^{max} \leq t_1 \cdot g_{d0,d1}^{min}$, D=0;
if $g_{h,v}^{max}/g_{h,v}^{min} > g_{d0,d1}^{max}/g_{d0,d1}^{min}$, perform step 3; otherwise, perform step 4;

if $g_{h,v}^{max} > t_2 \cdot g_{h,v}^{min}$, D=2; otherwise, D=1; or
if $g_{d0,d1}^{max} > t_2 \cdot g_{d0,d1}^{min}$, D=4; otherwise, D=3.

In a specific embodiment, the variation intensity Â of an image area corresponding to a luma block may be calculated in the following manner:

(1) Calculate a variation intensity A of the image area corresponding to the luma block:

$$A = \sum_{k=i-2}^{i+3} \sum_{l=j-2}^{j+3} (V_{k,l} + H_{k,l}).$$

(2) Further quantize A as an integer within [0, 4], and denote a quantized value as Â.

303. Determine a second index of each of a plurality of first chroma blocks, where the second index represents a category to which the first chroma blocks belong in a second class, there is a second correspondence between the second index and the filter index, and the first correspondence is the same as the second correspondence.

In this embodiment of the present invention, similar to the first index, the second index represents the category to which the first chroma blocks belong in the second class. In addition, the second correspondence between the second index and the filter index is similar to the first correspondence between the first index and the filter index. For details, refer to description of the first index and the first correspondence between the first index and the filter index. No further description is provided herein again.

In this embodiment of the present invention, the first correspondence is the same as the second correspondence. For example, the first correspondence is as follows: a first index value "0" is corresponding to a category-a filter, a first index value "1" is corresponding to a category-b filter, a first index value "2" is corresponding to a category-c filter, and a first index value "3" is corresponding to a category-d filter. The second correspondence is as follows: a second index value "0" is corresponding to a category-a filter, a second index value "1" is corresponding to a category-b filter, a second index value "2" is corresponding to a category-c filter, and a second index value "3" is corresponding to a category-d filter. The example is used only for explaining this embodiment of the present invention, and should not constitute a limitation.

It can be understood that, when the first correspondence is the same as the second correspondence, a filter used for filtering the first chroma blocks is usually a filter used for filtering the luma blocks. Therefore, a filtering coefficient of the filter for filtering the first chroma blocks does not need to be additionally transferred, and a bit rate occupied for transferring the filtering coefficient of the filter is reduced.

In this embodiment of the present invention, the digital video apparatus may determine the second index of each of the plurality of first chroma blocks in the following manners. In manner 1, the digital video apparatus determines the second index of each first chroma block based on a second relationship. The second relationship represents texture direction and a variation intensity of an image area corresponding to the first chroma block, and the second relationship is determined based on a pixel at a preset location in the first chroma block and a neighborhood pixel of the pixel at the preset location in the first chroma block. In manner 2, the digital video apparatus uses the first index of the luma block in the same image area corresponding to the first chroma block as the second index.

Figure 9:
FIG. 9 is a schematic diagram of comparison between a first index and a second index according to an embodiment of the present invention.

In manner 1, that the digital video apparatus determines the second index of each first chroma block based on the second relationship is similar to the previous step in which the digital video apparatus determines the first index of each luma block based on the first relationship. No further description is provided herein again. An example is used for description. As shown in FIG. 9, the first index of each luma block determined by the digital video apparatus based on the first relationship is shown in FIG. 9(a), and the second index of each first chroma block determined by the digital video apparatus based on the second relationship is shown in FIG. 9(b). It can be learned that, there is no association between the first index of each luma block and the second index of the corresponding first chroma block that are determined in this implementation. The example is used only for explaining this embodiment of the present invention, and should not constitute a limitation. The first relationship and the second relationship may be the same or different.

It can be understood that if the second index is determined in manner 1, the second index of each first chroma block can be accurately calculated, and the corresponding first chroma blocks are filtered by using a more appropriate filter, so that filtering accuracy is improved.

Figure 10:
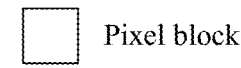
FIG. 10 is another schematic diagram of comparison between a first index and a second index according to an embodiment of the present invention.

In manner 2, the digital video apparatus uses, as the second index, the first index of the luma block in the same image area corresponding to the first chroma block. An example is used for description. As shown in FIG. 10, a luma block (as shown in a dashed round frame in the figure) in an upper left corner of FIG. 10(a) and a first chroma block (as shown in a dashed round frame in the figure) in an upper left corner of FIG. 10(b) are corresponding to a same image area. Therefore, the first index of the luma block in the upper left corner of FIG. 10(a) is directly used as the second index of the first chroma block in the upper left corner of FIG. 10(b). This is true to other first chroma blocks in FIG. 10(b). It can be learned that, the second index of each first chroma block that is determined in this implementation is associated with the first index of the corresponding luma block. The example is used only for explaining this embodiment of the present invention, and should not constitute a limitation.

It can be understood that, if the second index is determined in manner 2, a calculation amount generated during calculation of the second index can be avoided, so that calculation load of the digital video apparatus is reduced, and a processing speed is improved.

304. Filter the plurality of luma blocks by applying a filter corresponding to the first index.

305. Filter the plurality of first chroma blocks by applying a filter corresponding to the second index.

It can be understood that, according to this embodiment of the present invention, the plurality of first chroma blocks are filtered by using a plurality of filters corresponding to the second index, so that image filtering accuracy can be improved, and an image distortion rate can be reduced.

Further, after filtering the plurality of first chroma blocks by applying the filter corresponding to the second index, the digital video apparatus may further determine a target filter for the second chroma blocks, and filter the plurality of second chroma blocks by using the target filter, so that image filtering accuracy is further improved, and an image distortion rate is reduced. The following describes in detail several target filter determining manners provided in this embodiment of the present invention.

In a first manner, the digital video apparatus uses, as the target filter, the filter corresponding to the second index of the first chroma block in the same image area corresponding to the second chroma block. In other words, in this embodiment of the present invention, the second chroma block has no index, and the second index of the first chroma block in the same corresponding image area is directly reused, so that a bit rate occupied for transmitting an index to a decoder by an encoder is reduced.

In a second manner, the digital video apparatus determines a third index of each of the plurality of second chroma blocks, and uses a filter corresponding to the third index as the target filter.

In this embodiment of the present invention, similar to the first index, the third index represents a category to which the second chroma blocks belong in a third class. In addition, a third correspondence between the third index and the filter index is similar to the first correspondence between the first index and the filter index. For details, refer to description of the first index and the first correspondence between the first index and the filter index. No further description is provided herein again.

In this embodiment of the present invention, the first relationship, the second relationship, and the third relationship are the same. It can be understood that, when the first relationship, the second relationship, and the third relationship are the same, the filter used for filtering the first chroma blocks, the filter used for filtering the second chroma blocks, and the filter used for filtering the luma blocks are usually the same. Therefore, a filtering coefficient of the filter for filtering the first chroma blocks and the second chroma blocks does not need to be additionally transferred, so that a bit rate occupied for transferring the filtering coefficient of the filter is reduced.

Figure 11:
FIG. 11 is a schematic diagram of comparison between a first index, a second index, and a third index according to an embodiment of the present invention.
Figure 12:
FIG. 12 is another schematic diagram of comparison between a first index, a second index, and a third index according to an embodiment of the present invention.
Figure 13:
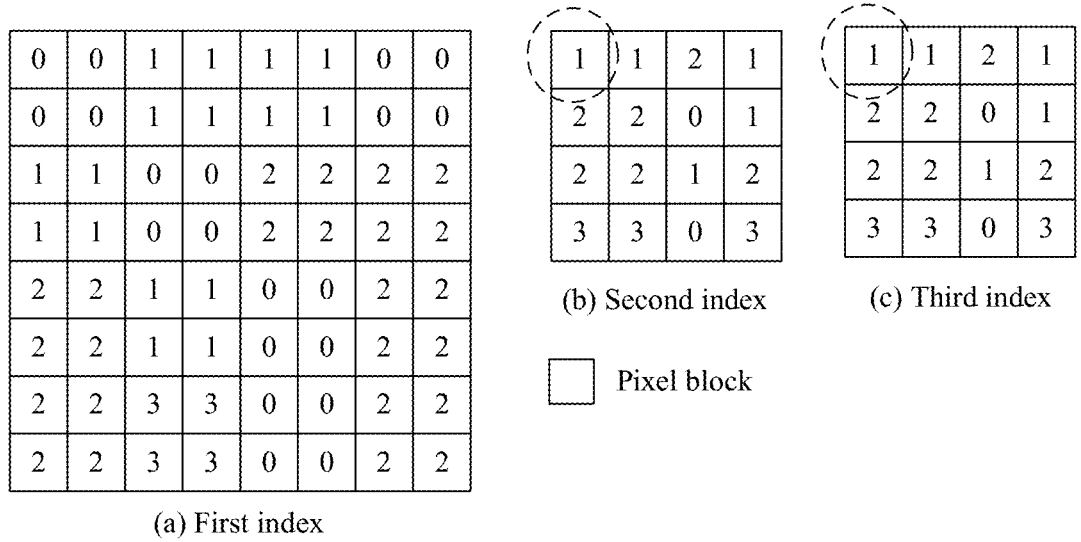
FIG. 13 is still another schematic diagram of comparison between a first index, a second index, and a third index according to an embodiment of the present invention.

The following separately describes, with reference to FIG. 11 to FIG. 13, several manners in which the digital video apparatus determines the third index of each of the plurality of second chroma blocks.

(1) The digital video apparatus determines the third index of each second chroma block based on a third relationship, and uses the filter corresponding to the third index as the target filter. The third relationship is determined based on a pixel at a preset location in the second chroma block and a neighborhood pixel of the pixel at the preset location in the second chroma block. The third relationship represents texture direction and a variation intensity of an image area corresponding to the second chroma block.

In this embodiment of the present invention, that the digital video apparatus determines the third index of each second chroma block based on the third relationship is similar to the previous step in which the digital video apparatus determines the first index of each luma block based on the first relationship. No further description is provided herein again. An example is used for description. As shown in FIG. 11, the first index determined by the digital video apparatus based on the first relationship is shown in FIG. 11(a), the second index determined by the digital video apparatus based on the second relationship is shown in FIG. 11(b), and the third index determined by the digital video apparatus based on the third relationship is shown in FIG. 11(c). It can be learned that, there is no association between the first index of the luma blocks, the second index of the first chroma blocks, and the third index of the second chroma blocks that are corresponding to a same image area and that are determined in this implementation.

It can be understood that, at least two of the first relationship, the second relationship, and the third relationship are the same, or the first relationship, the second relationship, and the third relationship are different from each other.

According to this implementation, the third index of each second chroma block can be accurately calculated, and the corresponding second chroma blocks are filtered by using a more appropriate filter, so that filtering accuracy is improved.

(2) The digital video apparatus uses the first index of the luma block in the same image area corresponding to the second chroma block as the third index, and uses the filter corresponding to the third index as the target filter. An example is used for description. As shown in FIG. 12, a luma block (as shown in a dashed round frame in the figure) in an upper left corner of FIG. 12(a) and a second chroma block (as shown in a dashed round frame in the figure) in an upper left corner of FIG. 12(c) are corresponding to a same image area. Therefore, the first index of the luma block in the upper left corner of FIG. 12(a) is directly used as the third index of the second chroma block in the upper left corner of FIG. 12(c). This is true to other second chroma blocks in FIG. 12(c). It can be learned that, the third index of the second chroma blocks that is determined in this implementation is associated with the first index of the corresponding luma block.

This implementation can be used to avoid a calculation amount generated by calculating the third index, so that calculation load of the digital video apparatus is reduced, and a processing speed is improved.

(3) The digital video apparatus uses the second index of the first chroma block in the same image area corresponding to the second chroma block as the third index, and uses the filter corresponding to the third index as the target filter. An example is used for description. As shown in FIG. 13, a first chroma block (as shown in a dashed round frame in the figure) in an upper left corner of FIG. 13(b) and a second chroma block (as shown in a dashed round frame in the figure) in an upper left corner of FIG. 13(c) are corresponding to a same image area. Therefore, the second index of the first chroma block in the upper left corner of FIG. 13(b) is directly used as the third index of the second chroma block in the upper left corner of FIG. 13(c). This is true to other second chroma blocks in FIG. 13(c). It can be learned that, the third index of the second chroma blocks that is determined in this implementation is associated with the second index of the corresponding first chroma blocks.

According to this implementation, a calculation amount generated by calculating the third index can be avoided, so that calculation load of the digital video apparatus is reduced, and a processing speed is improved. In addition, first chroma blocks and second chroma blocks corresponding to same image areas are relatively similar, and accuracy of the third index can be ensured by using the second index of the first chroma block in the same image area corresponding to the second chroma block as the third index.

An embodiment of the present invention provides a method for implementing the image filtering method based on an adaptive loop filter (ALF) in JVET-D1001, "Algorithm Description of Joint Exploration Test Model 4" (the documentation may be downloaded from http://phenix.int-evry.fr/jvet/, and is incorporated herein by reference in its entirety). The documentation is improved as follows:

A luma component classification method used for adaptive loop filter block classification in JVET-D1001 is separately applied to chroma components Cb and Cr. When the adaptive loop filter acts on a chroma component, it is assumed that (i, j) is coordinates of a chroma pixel in an upper left corner of a 2×2 chroma block, and that R(i, j) is a reconstructed chroma pixel at the coordinates (i, j). After classification is completed for three components: a luma component, a chroma component Cb, and a chroma component Cr, different luma component blocks, chroma component Cb blocks, and chroma component Cr blocks with a same class index are combined as one class, and share a same adaptive loop filter. Therefore, in an improved solution, different filtering coefficients of chroma and luma do not need to be transmitted separately. For a chroma component or a luma component, there is a correspondence between an index for adaptive loop filter block classification and a coefficient of an adaptive loop filter.

In addition, in picture-level shared auxiliary information, an indicator is encoded to indicate whether the adaptive loop filter solution in D1001 or the solution of this embodiment of the present invention is applicable.

In a feasible implementation, being on or off of an adaptive loop filter used for chroma is controlled in a unit of CTU. An indicator may be encoded in each CTU to indicate whether an adaptive loop filter is used for two chroma components in the CTU.

According to common test conditions of the JVET standard organization, experiment shows that in this embodiment of the present invention, a bit rate can be reduced by about 3% for a chroma component with same video quality.

Figure 14:
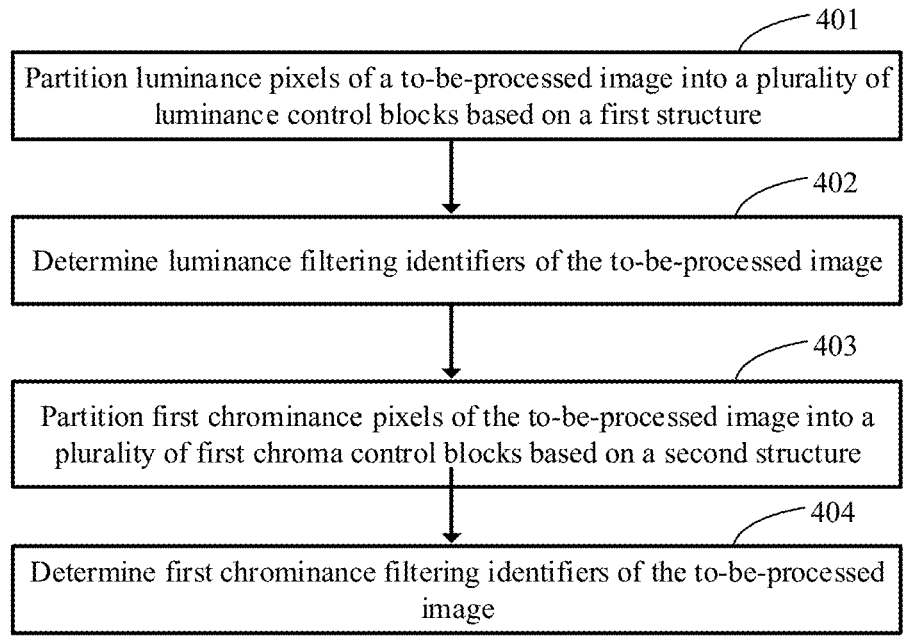
FIG. 14 is a schematic flowchart of an image block-partitioning control method according to an embodiment of the present invention.

An embodiment of the present invention further provides an image block-partitioning control method. The image block-partitioning control method provided in this embodiment of the present invention can be implemented to control, in a block partitioning manner, whether to perform filtering, so as to improve filtering accuracy. As shown in FIG. 14, the image block-partitioning control method in this embodiment of the present invention includes the following steps.

401. Partition luma pixels of a to-be-processed image into a plurality of luma control blocks based on a first structure, where each luma control block includes one or more adjacent luma pixels.

Figure 15:
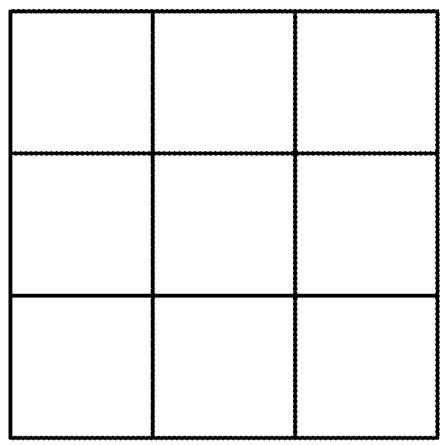
FIG. 15 is a schematic diagram of partitioning luma control blocks according to an embodiment of the present invention.
Figure 15:
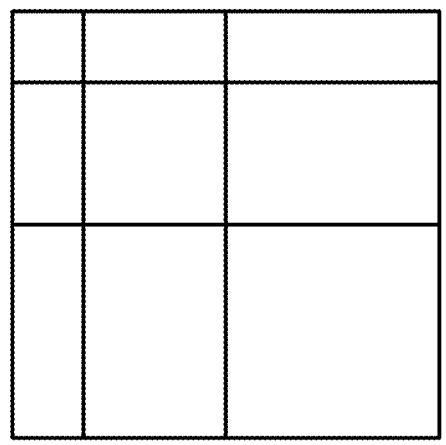

In this embodiment of the present invention, the plurality of luma control blocks obtained by a digital video apparatus by partitioning the luma pixels of the to-be-processed image based on the first structure may be the same or different. For example, as shown in FIG. 15(a), each square represents one luma control block, and sizes of luma control blocks are the same; and as shown in FIG. 15(b), each square represents one luma control block, and sizes of luma control blocks are different.

Figure 16:
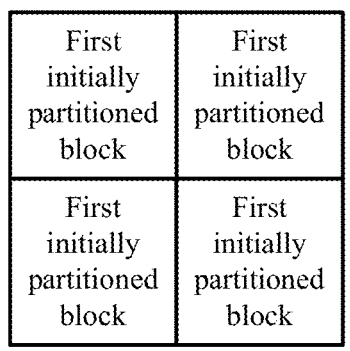
FIG. 16 is a schematic diagram of a process of partitioning luma control blocks according to an embodiment of the present invention.
Figure 16:
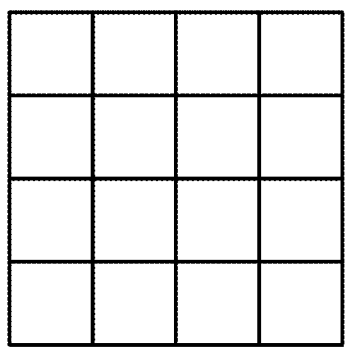
Figure 16:
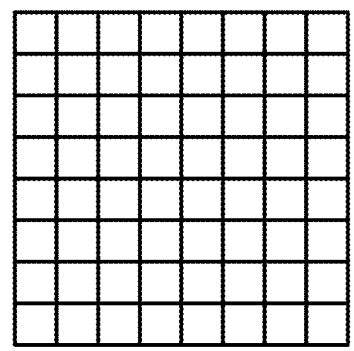

In a specific embodiment, a method in which the digital video apparatus partitions the luma pixels of the to-be-processed image into the plurality of luma control blocks based on the first structure is specifically: partitioning the luma pixels of the to-be-processed image into one or more equal-sized first initially partitioned blocks based on a preset size; and performing quadtree or binary-tree partitioning on the first initially partitioned blocks, to obtain the plurality of luma control blocks. An example is used for description. As shown in FIG. 16(a), the digital video apparatus first partitions the luma pixels of the to-be-processed image into four equal-sized first initially partitioned blocks based on a preset size, then performs first quadtree partitioning iteration on each first initially partitioned block, to obtain a result shown in FIG. 16(b), and finally performs second quadtree partitioning iteration on each first initially partitioned block, to obtain a result shown in FIG. 16(c). It can be understood that, in the foregoing example, description is provided by assuming that iteration is performed twice on the first initially partitioned blocks, and in another embodiment, iteration on the first initially partitioned blocks may alternatively be performed one time, three times, four times, or more times. This is not specifically limited in the present invention. In addition, in the foregoing example, description is provided by assuming that quadtree partitioning is performed on the first initially partitioned blocks, and in another embodiment, the first initially partitioned blocks may alternatively be partitioned in an asymmetric iteration manner. For example, a first initially partitioned block is partitioned into two blocks of different sizes. This is not specifically limited in the present invention.

402. Determine luma filtering identifiers of the to-be-processed image, where the luma filtering identifiers represent whether the respective luma control blocks in the to-be-processed image are to be filtered.

Figure 17:
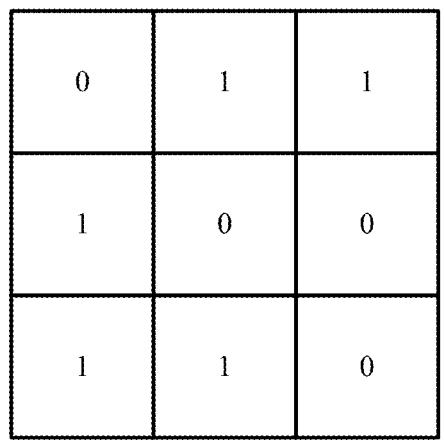
FIG. 17 is a schematic diagram of luma filtering identifiers of luma control blocks according to an embodiment of the present invention.

In this embodiment of the present invention, the luma filtering identifiers include at least a first value and a second value. The first value of the luma filtering identifiers indicates that a corresponding luma control block in the to-be-processed image is to be filtered, and the second value of the luma filtering identifiers indicates that a corresponding luma control block in the to-be-processed image is not to be filtered. For example, as shown in FIG. 17, each block represents one luma control block, and a digit in the block is a luma filtering identifier of the corresponding luma control block. A luma filtering identifier "0" indicates that a corresponding luma control block is not to be filtered, and a luma filtering identifier "1" indicates that a corresponding luma control block is to be filtered.

In this embodiment of the present invention, that the digital video apparatus determines the luma filtering identifiers of the to-be-processed image includes: if the image filtering method in this embodiment of the present invention is applied to a decoder, the luma filtering identifiers may be obtained by decoding a bitstream; or if the image filtering method in this embodiment of the present invention is applied to an encoder, candidate luma filtering identifiers with minimum encoding cost are selected from various preset candidate luma filtering identifiers as the luma filtering identifiers of the to-be-processed image.

403. Partition first chroma pixels of the to-be-processed image into a plurality of first chroma control blocks, where each first chroma control block includes one or more adjacent first chroma pixels.

In this embodiment of the present invention, the digital video apparatus partitions the first chroma pixels of the to-be-processed image into the plurality of first chroma control blocks in the following manners: (1) partitioning the first chroma pixels of the to-be-processed image into the plurality of first chroma control blocks based on the first structure; and (2) partitioning the first chroma pixels of the to-be-processed image into the plurality of first chroma control blocks based on a second structure. A method in which the digital video apparatus partitions the first chroma pixels of the to-be-processed image into the plurality of first chroma control blocks based on the first structure or the second structure is similar to the method in which the digital video apparatus partitions the luma pixels of the to-be-processed image into the plurality of luma control blocks based on the first structure. No further description is provided herein again.

It can be understood that, similar to the luma control blocks, sizes of the plurality of first chroma control blocks obtained by the digital video apparatus by partitioning the first chroma pixels of the to-be-processed image based on the first structure or the second structure may be the same or different. For details, refer to description of the luma control blocks. No further description is provided herein again.

Figure 18:
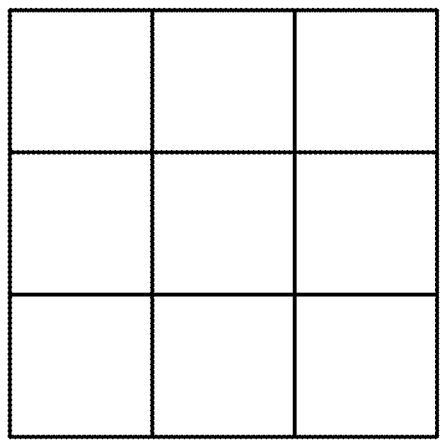
FIG. 18 is a schematic diagram of obtaining first chroma control blocks through partitioning by using a first structure according to an embodiment of the present invention.
Figure 18:
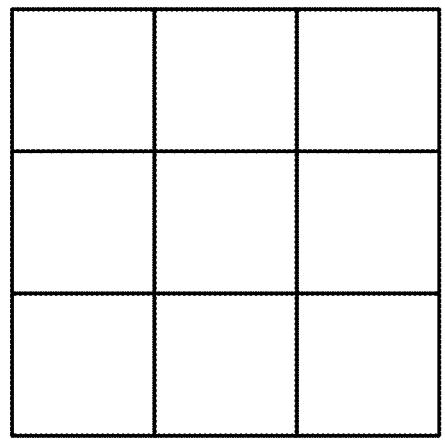
Figure 19:
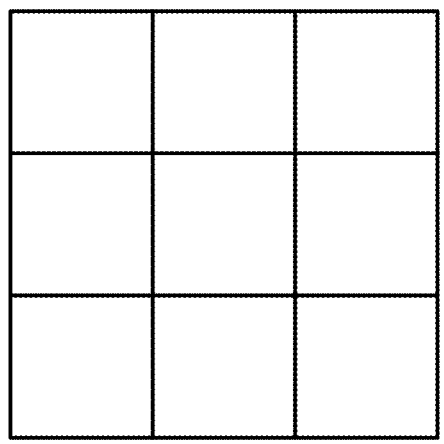
FIG. 19 is a schematic diagram of obtaining first chroma control blocks through partitioning by using a second structure according to an embodiment of the present invention.
Figure 19:
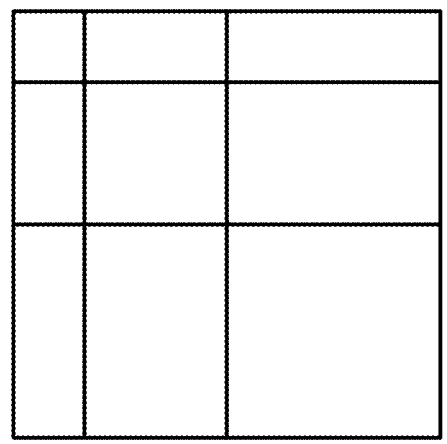

It can be understood that, the first structure and the second structure may be the same or different. For example, as shown in FIG. 18, the first structure is the same as the second structure; and as shown in FIG. 19, the first structure is different from the second structure.

404. Determine first chroma filtering identifiers of the to-be-processed image, where the first chroma filtering identifiers represent whether the respective first chroma control block in the to-be-processed image are to be filtered.

In this embodiment of the present invention, the determining first chroma filtering identifiers of the to-be-processed image includes: if the image filtering method in this embodiment of the present invention is applied to the decoder, the first chroma filtering identifiers may be obtained by decoding the bitstream; or if the image filtering method in this embodiment of the present invention is applied to the encoder, candidate first chroma filtering identifiers with minimum encoding cost are selected from various preset candidate first chroma filtering identifiers as the first chroma filtering identifiers of the to-be-processed image.

In this embodiment of the present invention, when the first structure is different from the second structure, the digital video apparatus may determine the first chroma filtering identifiers of the to-be-processed image according to the method provided in the previous paragraph. An example is used for description. As shown in FIG. 20, each block in FIGS. 20($a$) and 20($b$) is used to represent one luma control block, a digit in the block is used to represent a luma filtering identifier of the corresponding luma control block, each block in FIG. 20($b$) is used to represent one first chroma control block, and a digit in the block is used to represent a first chroma filtering identifier of the corresponding first chroma control block. It can be learned that, a luma filtering identifier (FIG. 20($a$)) of each luma control block and a first chroma filtering identifier (FIG. 20($b$)) of each first chroma control block are independent of each other, and there is no association between the two.

According to this implementation, the luma pixels and the first chroma pixels can be partitioned based on different structures depending on an actual requirement, so that freedom of filtering control is improved, and filtering accuracy is improved. In addition, the luma filtering identifiers of the luma control blocks and the first chroma filtering identifiers of the first chroma control blocks each are independently set, so that the freedom of filtering control can be further improved, and the filtering accuracy is also further improved.

In this embodiment of the present invention, when the first structure is the same as the second structure, the digital video apparatus may determine the first chroma filtering identifiers of the to-be-processed image according to the method provided in the previous two paragraphs. For example, as shown in FIG. 21, each block in FIGS. 21($a$) and 21($b$) is used to represent one luma control block, a digit in the block is used to represent a luma filtering identifier of the corresponding luma control block, each block in FIG. 21($b$) is used to represent one first chroma control block, and a digit in the block is used to represent a first chroma filtering identifier of the corresponding first chroma control block. It can be learned that, a luma filtering identifier (FIG. 21($a$)) of each luma control block and a first chroma filtering identifier (FIG. 21($b$)) of each first chroma control block are independent of each other, and there is no association between the two.

According to this implementation, partitioning the luma pixels and partitioning the first chroma pixels can be implemented more easily. In addition, the luma filtering identifiers of the luma control blocks and the first chroma filtering identifiers of the first chroma control blocks each are independently set, so that freedom of filtering control can be improved, and filtering accuracy can be improved.

In addition, the digital video apparatus may alternatively obtain the first chroma filtering identifiers by mapping the luma filtering identifiers. For example, as shown in FIG. 22, each block in FIG. 22($b$) is used to represent one first chroma control block, a digit in the block is used to represent a first chroma filtering identifier of the corresponding first chroma control block, each block in FIG. 22($a$) is used to represent one luminance control block, and a digit in the block is used to represent a luminance filtering identifier of the corresponding luminance control block. A first chroma filtering identifier of a first chroma control block (as shown in a dashed round frame in the figure) in an upper left corner of FIG. 22($b$) is set to be the same as a luma filtering identifier of a luma control block (as shown in a dashed round frame in the figure) that is in an upper left corner of FIG. 22($a$) and that is corresponding to a same location. This is true to other first chroma control blocks in FIG. 22($b$). It can be learned that, a first chroma filtering identifier of each first chroma control block is associated with a luma filtering identifier of a luma control block corresponding to a same location.

According to this implementation, partitioning the luma pixels and partitioning the first chroma pixels can be implemented more easily. In addition, the luma filtering identifiers of the luma control blocks are associated with the first chroma filtering identifiers of the first chroma control blocks, so that filtering identifier setting can be simplified, and a bit rate occupied for transmitting filtering identifiers to a decoder by an encoder can also be reduced.

Further, after determining the first chroma filtering identifiers of the to-be-processed image, the digital video apparatus may further partition second chroma pixels of the to-be-processed image into a plurality of second chroma control blocks, and then determine second chroma filtering identifiers of the to-be-processed image, to determine whether to filter the second chroma control blocks of the to-be-processed image, so that image filtering accuracy is further improved, and an image distortion rate is reduced.

In this embodiment of the present invention, the second chroma pixels of the to-be-processed image are partitioned into the plurality of second chroma control blocks in the following manners.

(1) The digital video apparatus partitions the second chroma pixels of the to-be-processed image into the plurality of second chroma control blocks based on the first structure. An example is used for description. As shown in FIG. 23, each square in FIG. 23(a) represents one luma control block, each square in FIG. 23(b) represents one first chroma control block, and each square in FIG. 23(c) represents one second chroma control block. Both the luma pixels and the second chroma pixels of the to-be-processed image are partitioned by using the first structure, to obtain a plurality of luma control blocks shown in FIG. 23(a) and a plurality of second chroma control blocks shown in FIG. 23(c).

In this case, the digital video apparatus may determine the second chroma filtering identifiers by referring to a method in step 402 of determining the luma filtering identifiers of the to-be-processed image. For details, refer to related description. An example is used for description. As shown in FIG. 24, each square in FIG. 24(a) represents one luma control block, a digit in the square represents a luma filtering identifier of the luma control block, each square in FIG. 24(b) represents one first chroma control block, a digit in the square represents a first chroma filtering identifier of the first chroma control block, each square in FIG. 24(c) represents one second chroma control block, and a digit in the square represents a second chroma filtering identifier of the second chroma control block. It can be learned that, although both the luma pixels and the second chroma pixels of the to-be-processed image are partitioned by using the first structure, to obtain a plurality of luma control blocks shown in FIG. 24(a) and a plurality of second chroma control blocks shown in FIG. 24(c), a luma filtering identifier of each luma control block and a second chroma filtering identifier of each second chroma control block are independent of each other, and there is no association between the two.

According to this implementation, Partitioning the luma pixels and partitioning the second chroma pixels can be implemented more easily. In addition, the luma filtering identifiers of the luma control blocks and the second chroma filtering identifiers of the second chroma control blocks each are independently set, so that freedom of filtering control can be improved, and filtering accuracy can be improved.

The digital video apparatus may alternatively obtain the second chroma filtering identifiers by mapping the luma filtering identifiers. An example is used for description. As shown in FIG. 25, each square in FIG. 25(a) represents one luma control block, a digit in the square represents a luma filtering identifier of the luma control block, each square in FIG. 25(b) represents one first chroma control block, a digit in the square represents a first chroma filtering identifier of the first chroma control block, each square in FIG. 25(c) represents one second chroma control block, and a digit in the square represents a second chroma filtering identifier of the second chroma control block. A second chroma filtering identifier of a second chroma control block (as shown in a dashed round frame in the figure) in an upper left corner of FIG. 25(c) is set to be the same as a luma filtering identifier of a luma control block (as shown in a dashed round frame in the figure) that is in an upper left corner of FIG. 25(a) and that is corresponding to a same location. This is true to other second chroma control blocks in FIG. 25(c). It can be learned that, both the luma pixels and the second chroma pixels of the to-be-processed image are partitioned by using the first structure, to obtain a plurality of luma control blocks shown in FIG. 25(a) and a plurality of second chroma control blocks shown in FIG. 25(c). In addition, a second chroma filtering identifier of each second chroma control block is associated with a luma filtering identifier of a luma control block corresponding to a same location.

According to this implementation, Partitioning the luma pixels and partitioning the second chroma pixels can be implemented more easily. In addition, the luma filtering identifiers of the luma control blocks are associated with the second chroma filtering identifiers of the second chroma control blocks, so that filtering identifier setting can be simplified, and a bit rate occupied for transmitting filtering identifiers to a decoder by an encoder can also be reduced.

(2) The digital video apparatus partitions the second chroma pixels of the to-be-processed image into the plurality of second chroma control blocks based on the second structure. An example is used for description. As shown in FIG. 26, each square in FIG. 26(a) represents one luma control block, each square in FIG. 26(b) represents one first chroma control block, and each square in FIG. 26(c) represents one second chroma control block. Both the first chroma pixels (FIG. 26b) and the second chroma pixels (FIG. 26c) of the to-be-processed image are partitioned by using the second structure, to obtain a plurality of first chroma control blocks shown in FIG. 26(b) and a plurality of second chroma control blocks shown in FIG. 26(c).

In this case, the digital video apparatus may obtain the second chroma filtering identifiers by referring to the method in step 402 of determining the luma filtering identifiers of the to-be-processed image. For details, refer to related description. An example is used for description. As shown in FIG. 27, each square in FIG. 27(a) represents one luma control block, a digit in the square represents a luma filtering identifier of the luma control block, each square in FIG. 27(b) represents one first chroma control block, a digit in the square represents a first chroma filtering identifier of the first chroma control block, each square in FIG. 27(c) represents one second chroma control block, and a digit in the square represents a second chroma filtering identifier of the second chroma control block. It can be learned that, although both the first chroma pixels and the second chroma pixels of the to-be-processed image are partitioned by using the second structure, to obtain a plurality of first chroma control blocks shown in FIG. 27(b) and a plurality of second chroma control blocks shown in FIG. 27(c), a first chroma filtering identifier of each first chroma control block and a second chroma filtering identifier of each second chroma control block are independent of each other, and there is no association between the two.

According to this implementation, partitioning the first chroma pixels and partitioning the second chroma pixels can be implemented more easily. In addition, the first chroma filtering identifiers of the first chroma control blocks and the second chroma filtering identifiers of the second chroma control blocks each are independently set, so that freedom of filtering control can be improved, and filtering accuracy can be improved.

Figures 28, 29:
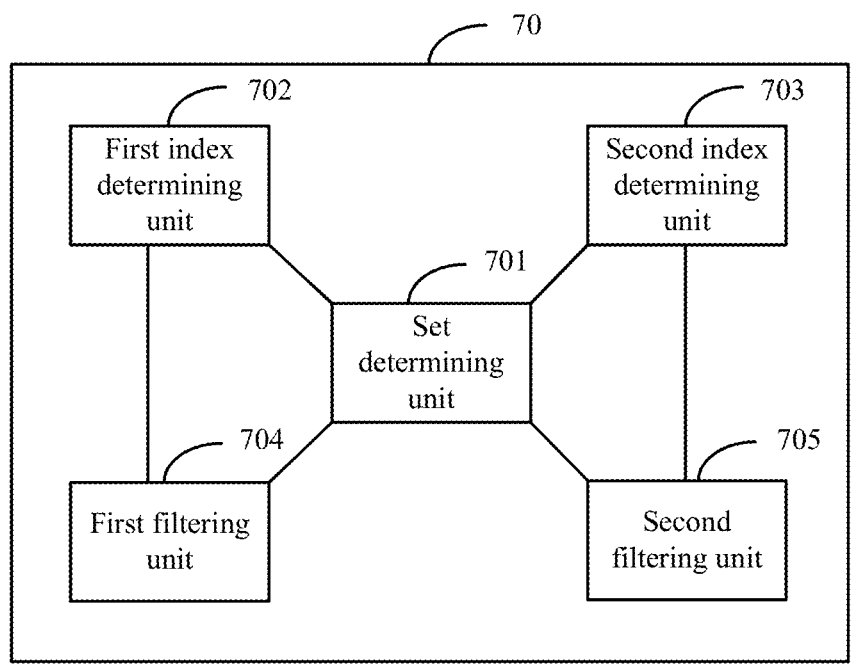
FIG. 28 is a schematic diagram of another type of second chroma filtering identifiers of second chroma control blocks obtained through partitioning by using a second structure according to an embodiment of the present invention.
FIG. 29 is a schematic structural diagram of an image filtering apparatus according to an embodiment of the present invention.

The digital video apparatus may alternatively obtain the second chroma filtering identifiers by mapping the first chroma filtering identifiers. An example is used for description. As shown in FIG. 28, each square in FIG. 28(a) represents one luma control block, a digit in the square represents a luma filtering identifier of the luma control block, each square in FIG. 28(b) represents one first chroma control block, a digit in the square represents a first chroma filtering identifier of the first chroma control block, each square in FIG. 28(c) represents one second chroma control block, and a digit in the square represents a second chroma filtering identifier of the second chroma control block. A second chroma filtering identifier of a second chroma control block (as shown in a dashed round frame in the figure) in an upper left corner of FIG. 28(c) is set to be the same as a first chroma filtering identifier of a first chroma control block (as shown in a dashed round frame in the figure) that is in an upper left corner of FIG. 28(b) and that is corresponding to a same location. This is true to other second chroma control blocks in FIG. 28(c). It can be learned that, both the first chroma pixels and the second chroma pixels of the to-be-processed image are partitioned by using the second structure, to obtain a plurality of first chroma control blocks shown in FIG. 28(b) and a plurality of second chroma control blocks shown in FIG. 28(c). In addition, a second chroma filtering identifier of each second chroma control block is associated with a first chroma filtering identifier of a first chroma control block corresponding to a same location.

According to this implementation, partitioning the first chroma pixels and partitioning the second chroma pixels can be implemented more easily. In addition, the first chroma filtering identifiers of the first chroma control blocks are associated with the second chroma filtering identifiers of the second chroma control blocks, so that filtering identifier setting can be simplified, and a bit rate occupied for transmitting filtering identifiers to a decoder by an encoder can also be reduced.

(3) The digital video apparatus partitions the second chroma pixels of the to-be-processed image into the plurality of second chroma control blocks based on a third structure. A method in which the digital video apparatus partitions the second chroma pixels of the to-be-processed image into the plurality of second chroma control blocks based on the third structure is similar to the method in which the digital video apparatus partitions the luma pixels of the to-be-processed image into the plurality of luma control blocks based on the first structure. No further description is provided herein again.

In this embodiment of the present invention, similar to the luma control blocks, sizes of the plurality of second chroma control blocks obtained by the digital video apparatus by partitioning the second chroma pixels of the to-be-processed image based on the third structure may be the same or different. For details, refer to description of the luma control blocks. No further description is provided herein again.

It can be understood that, at least two of the first structure, the second structure, and the third structure are the same, or the first structure, the second structure, and the third structure are different from each other. In an optional embodiment, a minimum partitioning unit of the first structure is the luma block in the method corresponding to FIG. 6, a minimum partitioning unit of the second structure is the first chroma block in the method corresponding to FIG. 6, and a minimum partitioning unit of the third structure is the second chroma block in the method corresponding to FIG. 6.

An embodiment of the present invention further provides an image filtering method, where the image block-partitioning control method shown in FIG. 14 may be first performed, to perform block-partitioning control on luma pixels, first chroma pixels, and second chroma pixels, and then the image filtering manner shown in FIG. 6 is performed to filter a to-be-processed image, to obtain better image filtering accuracy. It should be noted that in this case, a minimum partitioning unit of a first structure is the luma block in the method corresponding to FIG. 6, a minimum partitioning unit of a second structure is the first chroma block in the method corresponding to FIG. 6, and a minimum partitioning unit of a third structure is the second chroma block in the method corresponding to FIG. 6.

Referring to FIG. 29, an embodiment of the present invention further provides an image filtering apparatus, configured to perform the image filtering method described in the embodiment of FIG. 6.

As shown in FIG. 29, an image filtering apparatus 70 may include: a set determining unit 701, a first index determining unit 702, a second index determining unit 703, a first filtering unit 704, and a second filtering unit 705.

The set determining unit 701 is configured to determine a filter set corresponding to a to-be-processed image, where the filter set includes one or more filters, and the one or more filters have a respective filter index.

The first index determining unit 702 is configured to determine a first index of each of a plurality of luma blocks, where the first index represents a category to which the luma blocks belong in a first class, and there is a first correspondence between the first index and the filter index.

The second index determining unit 703 is configured to determine a second index of each of a plurality of first chroma blocks, where the second index represents a category to which the first chroma blocks belong in a second class, there is a second correspondence between the second index and the filter index, and the first correspondence is the same as the second correspondence.

The first filtering unit 704 is configured to filter the plurality of luma blocks by applying a filter corresponding to the first index.

The second filtering unit 705 is configured to filter the plurality of first chroma blocks by applying a filter corresponding to the second index.

It should be noted that, through the foregoing detailed description on the embodiment of FIG. 6, a person skilled in the art can clearly know an implementation method of functional modules included in the image filtering apparatus 70. Therefore, for brevity in this specification, details are not described herein again.

Figure 30:
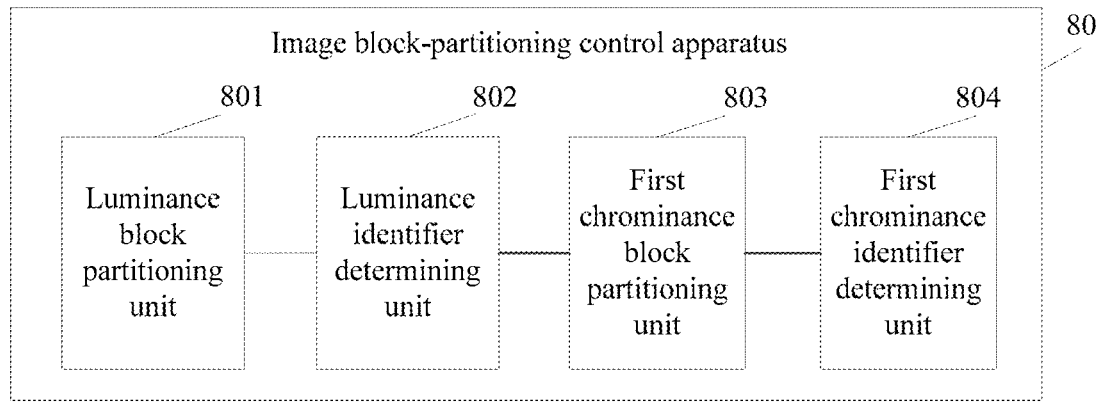
FIG. 30 is a schematic structural diagram of an image block-partitioning control apparatus according to an embodiment of the present invention.

Referring to FIG. 30, an embodiment of the present invention further provides an image block-partitioning control apparatus, configured to perform the image block-partitioning control method described in the embodiment of FIG. 14.

As shown in FIG. 30, an image block-partitioning control apparatus 80 may include: a luma block partitioning unit 801, a luma identifier determining unit 802, a first chroma block partitioning unit 803, and a first chroma identifier determining unit 804.

The luma block partitioning unit 801 is configured to partition luma pixels of a to-be-processed image into a plurality of luma control blocks based on a first structure, where each luma control block includes one or more adjacent luma pixels.

The luma identifier determining unit 802 is configured to determine luma filtering identifiers of the to-be-processed image, where the luma filtering identifiers represent whether the respective luma control block in the to-be-processed image are to be filtered.

The first chroma block partitioning unit 803 is configured to partition first chroma pixels of the to-be-processed image into a plurality of first chroma control blocks, where each first chroma control block includes one or more adjacent first chroma pixels.

The first chroma identifier determining unit 804 is configured to determine first chroma filtering identifiers of the to-be-processed image, where the first chroma filtering identifiers represent whether the respective first chroma control blocks in the to-be-processed image are to be filtered.

It should be noted that, through the foregoing detailed description on the embodiment of FIG. 14, a person skilled in the art can clearly know an implementation method of functional modules included in the image block-partitioning control apparatus 80. Therefore, for brevity in this specification, details are not described herein again.

Figure 31:
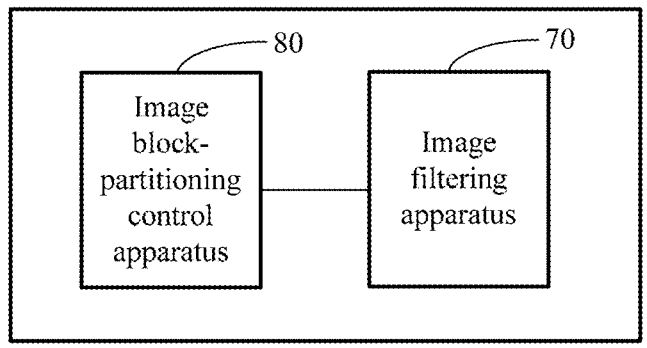
FIG. 31 is a schematic structural diagram of another image filtering apparatus according to an embodiment of the present invention.

As shown in FIG. 31, an embodiment of the present invention further provides an image filtering apparatus, including the image block-partitioning control apparatus 80 shown in FIG. 30 and the image filtering apparatus 70 shown in FIG. 29. The image block-partitioning control apparatus 80 shown in FIG. 30 is configured to perform the image block-partitioning control method described in the embodiment of FIG. 14, and the image filtering apparatus 70 shown in FIG. 29 is configured to perform the image filtering method described in the embodiment of FIG. 6. It should be noted that in this case, a minimum partitioning unit of a first structure is the luma block in the method corresponding to FIG. 6, a minimum partitioning unit of a second structure is the first chroma block in the method corresponding to FIG. 6, and a minimum partitioning unit of a third structure is the second chroma block in the method corresponding to FIG. 6.

Figure 32A:
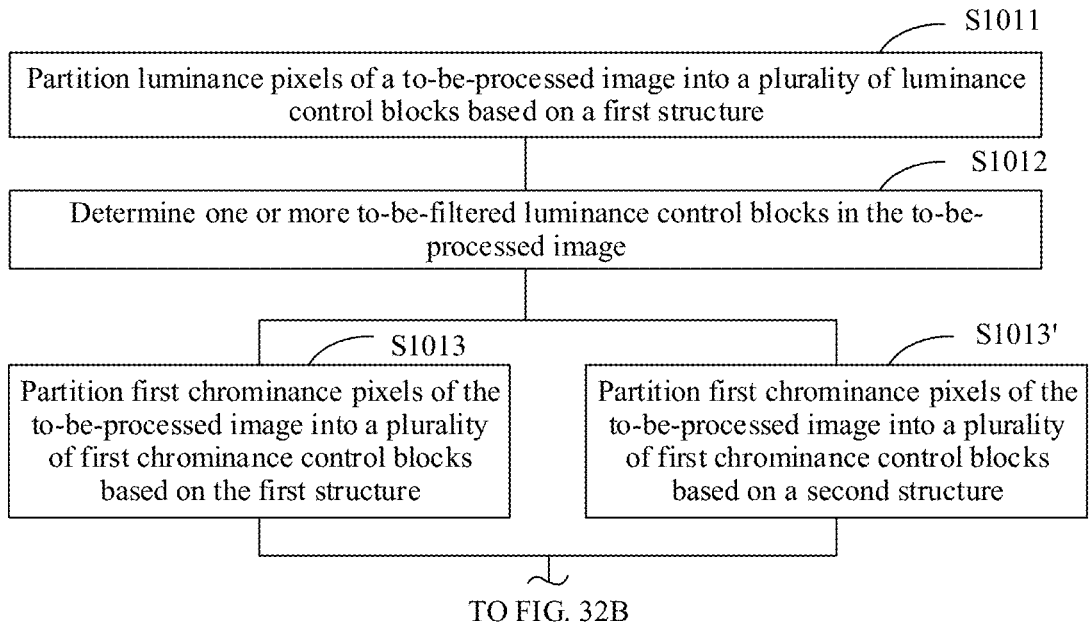
FIG. 32A and FIG. 32B are a schematic flowchart of an image filtering method according to an embodiment of the present invention.
Figure 32B:
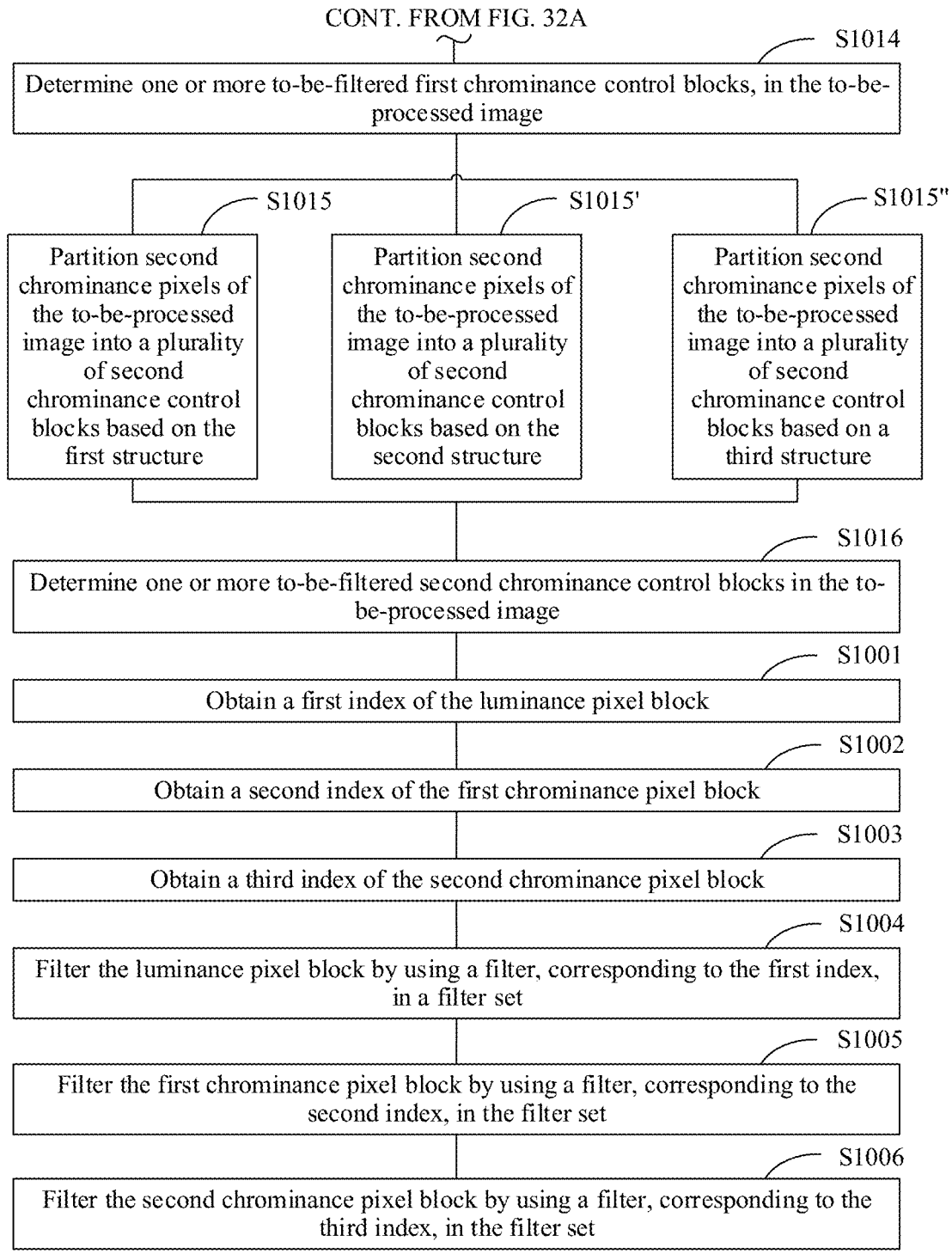

In an image filtering method 1000 shown in FIG. 32A and FIG. 32B, a to-be-processed image includes a plurality of luma blocks and a plurality of first chroma blocks, the luma block includes a plurality of adjacent luma pixels, the first chroma block includes a plurality of adjacent first chroma pixels, and the method includes the following steps.

S1001. Obtain a first index of the luma block, where the first index represents a filter type applicable to an image feature corresponding to the luma block.

In a feasible implementation, the obtaining a first index of the luma block includes: classifying the luma blocks based on a first relationship, to obtain the first index, where the first relationship includes texture direction and a variation intensity of an image area corresponding to the luma block.

In a feasible implementation, the texture direction and the variation intensity of the image area corresponding to the luma block are determined by using a pixel at a preset location in the luma block and a neighborhood pixel of the pixel at the preset location in the luma block.

S1002. Obtain a second index of the first chroma block, where the second index represents a filter type applicable to an image feature corresponding to the first chroma block.

In a feasible implementation, the obtaining a second index of the first chroma block includes: classifying the first chroma blocks based on a second relationship, to obtain the second index, where the second relationship includes texture direction and a variation intensity of an image area corresponding to the first chroma block.

In a feasible implementation, the texture direction and the variation intensity of the image area corresponding to the first chroma block are determined by using a pixel at a preset location in the first chroma block and a neighborhood pixel of the pixel at the preset location in the first chroma block.

This embodiment of the present invention has the following beneficial effects: The second index of each first chroma block can be accurately calculated, and the corresponding first chroma blocks are filtered by using a more appropriate filter, so that filtering accuracy is improved.

In a feasible implementation, the obtaining a second index of the first chroma block includes: using the first index of the luma block in the same image area corresponding to the first chroma block as the second index.

This embodiment of the present invention has the following beneficial effects: The first chroma blocks have no index, and the first index of the luma blocks in the same corresponding image areas is directly reused, so that a bit rate occupied for transmitting an index to a decoder by an encoder is reduced.

S1004. Filter the luma block by applying a filter, corresponding to the first index, in a filter set.

S1005. Filter the first chroma block by applying a filter, corresponding to the second index, in the filter set.

This embodiment of the present invention has the following beneficial effects: The filter used for filtering the first chroma blocks is usually the filter used for filtering the luma blocks. Therefore, a filtering coefficient of the filter for filtering the first chroma blocks does not need to be additionally transferred, so that a bit rate occupied for transferring the filtering coefficient of the filter is reduced.

In a feasible implementation, the method further includes: when a value of the first index is the same as a value of the second index, the filter corresponding to the first index is the same as the filter corresponding to the second index.

In a feasible implementation, the to-be-processed image further includes a plurality of second chroma blocks, the second chroma block includes a plurality of adjacent second chroma pixels, and after the obtaining a second index of the first chroma block, the method further includes:

S1003. Obtain a third index of the second chroma block, where the third index represents a filter type applicable to an image feature corresponding to the second chroma block.

In a feasible implementation, the obtaining a third index of the second chroma block includes: classifying the second chroma blocks based on a third relationship, to obtain the third index, where the third relationship includes texture direction and a variation intensity of an image area corresponding to the second chroma block.

In a feasible implementation, the texture direction and the variation intensity of the image area corresponding to the second chroma block are determined by using a pixel at a preset location in the second chroma block and a neighborhood pixel of the pixel at the preset location in the second chroma block.

This embodiment of the present invention has the following beneficial effects: The third index of each second chroma block can be accurately calculated, and the corresponding second chroma blocks are filtered by using a more appropriate filter, so that filtering accuracy is improved.

In a feasible implementation, the obtaining a third index of the second chroma block includes: using the first index of the luma block in the same image area corresponding to the second chroma block as the third index; or using the second index of the first chroma block in the same image area corresponding to the second chroma block as the third index.

This embodiment of the present invention has the following beneficial effects: The second chroma block has no index, and the second index of the first chroma block in the same corresponding image area is directly reused, so that a bit rate occupied for transmitting an index to a decoder by an encoder is reduced.

Correspondingly, after the filtering the first chroma block by applying a filter, corresponding to the second index, in the filter set, the method further includes:

S1006. Filter the second chroma block by applying a filter, corresponding to the third index, in the filter set.

This embodiment of the present invention has the following beneficial effects: After the plurality of first chroma blocks are filtered by applying the filter corresponding to the second index, a target filter may be further determined for the second chroma blocks, and the plurality of second chroma blocks are filtered by using the target filter, so that image filtering accuracy is further improved, and an image distortion rate is reduced.

In a feasible implementation, at least two of the first relationship, the second relationship, and the third relationship are the same.

This embodiment of the present invention has the following beneficial effects: When the first correspondence, the second correspondence, and the third relationship are the same, the filter used for filtering the first chroma blocks, the filter used for filtering the second chroma blocks, and the filter used for filtering the luma blocks are usually the same. Therefore, a filtering coefficient of the filter for filtering the first chroma blocks and the second chroma blocks does not need to be additionally transferred, so that a bit rate occupied for transferring the filtering coefficient of the filter is reduced.

In a feasible implementation, the first relationship, the second relationship, and the third relationship are different from each other.

In a feasible implementation, a size of the first chroma block is greater than that of the luma block; and a size of the second chroma block is greater than that of the luma block.

This embodiment of the present invention has the following beneficial effects: Different processing manners may be used based on different image details included in a chroma block and a luma block, so that processing efficiency is improved.

In a feasible implementation, the method is used for a decoder, and before the obtaining a first index of the luma block, the method further includes: parsing a bitstream, to obtain information about the filter set.

In a feasible implementation, the method is used for an encoder, and before the obtaining a first index of the luma block, the method further includes: selecting a candidate filter set with minimum encoding cost from preset candidate filters set as the filter set; and encoding information about the filter set.

In a feasible implementation, before the obtaining a first index of the luma block, the method further includes:

S1011. Partition luma pixels of the to-be-processed image into a plurality of luma control blocks based on a first structure, where each luma control block includes one or more adjacent luma blocks.

In a feasible implementation, the partitioning luma pixels of the to-be-processed image into a plurality of luma control blocks based on a first structure includes: partitioning the luma pixels of the to-be-processed image into one or more equal-sized first initially partitioned blocks based on a preset size; and performing quadtree or binary-tree partitioning on the first initially partitioned blocks, to obtain the plurality of luma control blocks.

This embodiment of the present invention has the following beneficial effects: Image area partitioning is more flexible, and this better facilitates regional filtering.

S1012. Determine one or more to-be-filtered luma control blocks in the to-be-processed image, where luma filtering identifiers represent whether the respective luma control blocks in the to-be-processed image are to be filtered.

In a feasible implementation, the method is used for the decoder, and the determining one or more to-be-filtered luma control blocks in the to-be-processed image includes: decoding the bitstream, to obtain information about the luma filtering identifiers.

In a feasible implementation, the method is used for the encoder, and the determining one or more to-be-filtered luma control blocks in the to-be-processed image includes: selecting candidate luma filtering identifiers with minimum encoding cost from a preset candidate luma filtering identifier set as the luma filtering identifiers.

In a feasible implementation, after the determining one or more to-be-filtered luma control blocks in the to-be-processed image, the method further includes: encoding information about the luma filtering identifiers.

This embodiment of the present invention has the following beneficial effects: Filtering different areas of an image is controlled independently, so that applicability of the filtering method is improved.

In a feasible implementation, after the determining one or more to-be-filtered luma control blocks in the to-be-processed image, the method further includes:

S1014. Determine one or more to-be-filtered first chroma control blocks in the to-be-processed image, where first chroma filtering identifiers represent whether the respective first chroma control blocks in the to-be-processed image are to be filtered, and each first chroma control block includes one or more adjacent first chroma blocks.

In a feasible implementation, the method is used for the decoder, and the determining one or more to-be-filtered first chroma control blocks in the to-be-processed image includes: decoding the bitstream, to obtain information about the first chroma filtering identifiers.

In a feasible implementation, the method is used for the encoder, and the determining one or more to-be-filtered first chroma control blocks in the to-be-processed image includes: selecting candidate first chroma filtering identifiers with minimum encoding cost from a preset candidate first chroma filtering identifier set as the first chroma filtering identifiers.

In a feasible implementation, after the determining one or more to-be-filtered first chroma control blocks in the to-be-processed image, the method further includes: encoding information about the first chroma filtering identifiers.

This embodiment of the present invention has the following beneficial effects: Filtering different areas of an image is controlled independently, so that applicability of the filtering method is improved.

In a feasible implementation, before the determining one or more to-be-filtered first chroma control blocks in the to-be-processed image, the method further includes:

S1013. Partition first chroma pixels of the to-be-processed image into a plurality of first chroma control blocks based on the first structure. Correspondingly, the determining one or more to-be-filtered first chroma control blocks in the to-be-processed image includes: obtaining the first chroma filtering identifiers by mapping the luma filtering identifiers.

This embodiment of the present invention has the following beneficial effects: Partitioning the luma pixels and partitioning the first chroma pixels can be implemented more easily. In addition, the luma filtering identifiers of the luma control blocks are associated with the first chroma filtering identifiers of the first chroma control blocks, so that filtering identifier setting can be simplified, and a bit rate occupied for transmitting filtering identifiers to a decoder by an encoder can also be reduced.

In a feasible implementation, before the determining one or more to-be-filtered first chroma control blocks in the to-be-processed image, the method further includes:

S1013'. Partition first chroma pixels of the to-be-processed image into a plurality of first chroma control blocks based on a second structure.

This embodiment of the present invention has the following beneficial effects: According to this implementation, the luma pixels and the first chroma pixels can be partitioned based on different structures depending on an actual requirement, so that freedom of filtering control is improved, and filtering accuracy is improved. In addition, the luma filtering identifiers of the luma control blocks and the first chroma filtering identifiers of the first chroma control blocks each are independently set, so that the freedom of filtering control can be further improved, and the filtering accuracy is also further improved.

In a feasible implementation, the partitioning first chroma pixels of the to-be-processed image into a plurality of first chroma control blocks based on a second structure includes: partitioning the first chroma pixels of the to-be-processed image into one or more equal-sized second initially partitioned blocks based on a preset size; and performing quadtree or binary-tree partitioning on the second initially partitioned blocks, to obtain the plurality of first chroma control blocks.

In a feasible implementation, after the determining one or more to-be-filtered first chroma control blocks in the to-be-processed image, the method further includes:

S1016. Determine one or more to-be-filtered second chroma control blocks in the to-be-processed image, where second chroma filtering identifiers represent whether the respective second chroma control block in the to-be-processed image are to be filtered, and each second chroma control block includes one or more adjacent second chroma blocks.

In a feasible implementation, the method is used for the decoder, and the determining one or more to-be-filtered second chroma control blocks in the to-be-processed image includes: decoding the bitstream, to obtain information about the second chroma filtering identifiers.

In a feasible implementation, the method is used for the encoder, and the determining one or more to-be-filtered second chroma control blocks in the to-be-processed image includes: selecting candidate second chroma filtering identifiers with minimum encoding cost from a preset candidate second chroma filtering identifier set as the second chroma filtering identifiers.

In a feasible implementation, after the determining one or more to-be-filtered second chroma control blocks in the to-be-processed image, the method further includes: encoding information about the second chroma filtering identifiers.

This embodiment of the present invention has the following beneficial effects: After the one or more to-be-filtered first chroma control blocks in the to-be-processed image are determined, second chroma pixels of the to-be-processed image may be further partitioned into a plurality of second chroma control blocks, and then the one or more to-be-filtered second chroma control blocks in the to-be-processed image are determined, to determine whether to filter the second chroma control blocks of the to-be-processed image, so that image filtering accuracy is further improved, and an image distortion rate is reduced.

In a feasible implementation, before the determining one or more to-be-filtered second chroma control blocks in the to-be-processed image, the method further includes:

S1015. Partition second chroma pixels of the to-be-processed image into a plurality of second chroma control blocks based on the first structure. Correspondingly, the determining one or more to-be-filtered second chroma control blocks in the to-be-processed image includes: obtaining the second chroma filtering identifiers by mapping the luma filtering identifiers.

This embodiment of the present invention has the following beneficial effects: Partitioning the luma pixels and partitioning the second chroma pixels can be implemented more easily. In addition, the luma filtering identifiers of the luma control blocks are associated with the second chroma filtering identifiers of the second chroma control blocks, so that filtering identifier setting can be simplified, and a bit rate occupied for transmitting filtering identifiers to a decoder by an encoder can also be reduced.

In a feasible implementation, before the determining one or more to-be-filtered second chroma control blocks in the to-be-processed image, the method further includes:

S1015'. Partition second chroma pixels of the to-be-processed image into a plurality of second chroma control blocks based on the second structure. Correspondingly, the determining one or more to-be-filtered second chroma control blocks in the to-be-processed image includes: obtaining the second chroma filtering identifiers by mapping the first chroma filtering identifiers.

This embodiment of the present invention has the following beneficial effects: Partitioning the first chroma pixels and partitioning the second chroma pixels can be implemented more easily. In addition, the first chroma filtering identifiers of the first chroma control blocks are associated with the second chroma filtering identifiers of the second chroma control blocks, so that filtering identifier setting can be simplified, and a bit rate occupied for transmitting filtering identifiers to a decoder by an encoder can also be reduced.

In a feasible implementation, before the determining one or more to-be-filtered second chroma control blocks in the to-be-processed image, the method further includes:

S1015". Partition second chroma pixels of the to-be-processed image into a plurality of second chroma control blocks based on a third structure.

In a feasible implementation, the partitioning second chroma pixels of the to-be-processed image into a plurality of second chroma control blocks based on a third structure includes: partitioning the second chroma pixels of the to-be-processed image into one or more equal-sized third initially partitioned blocks based on a preset size; and performing quadtree or binary-tree partitioning on the third initially partitioned blocks, to obtain the plurality of second chroma control blocks.

In a feasible implementation, at least two of the first structure, the second structure, and the third structure are the same.

In a feasible implementation, the first structure, the second structure, and the third structure are different from each other.

Figure 33:
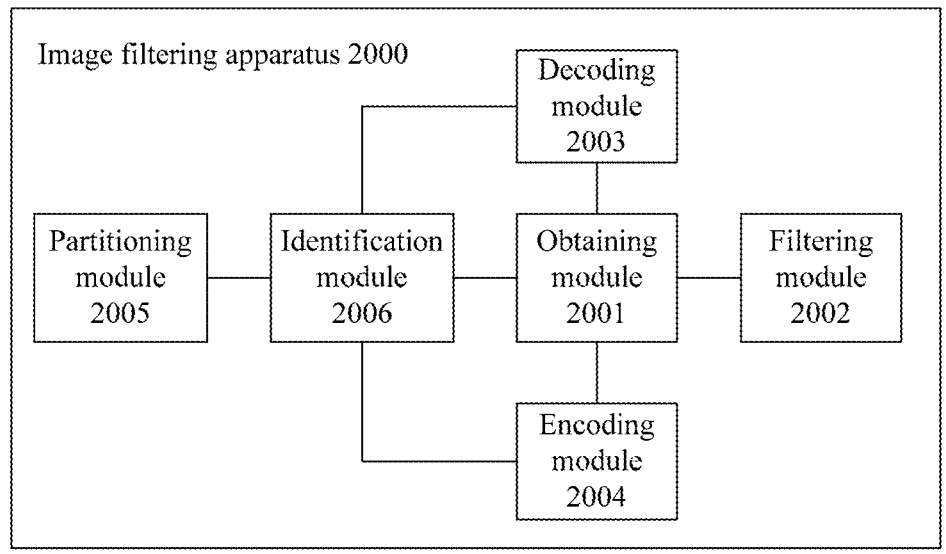
FIG. 33 is a schematic structural diagram of an image filtering apparatus according to an embodiment of the present invention.

In an image filtering apparatus 2000 shown in FIG. 33, a to-be-processed image includes a plurality of luma blocks and a plurality of first chroma blocks, the luma block includes a plurality of adjacent luma pixels, the first chroma block includes a plurality of adjacent first chroma pixels, and the apparatus includes: an obtaining module 2001, configured to obtain a first index of the luma block, where the first index represents a filter type applicable to an image feature corresponding to the luma block, the obtaining module 2001 is further configured to obtain a second index of the first chroma block, and the second index represents a filter type applicable to an image feature corresponding to the first chroma block; and a filtering module 2002, configured to filter the luma block by applying a filter, corresponding to the first index, in a filter set, where the filtering module 2002 is further configured to filter the first chroma block by applying a filter, corresponding to the second index, in the filter set.

In a feasible implementation, when a value of the first index is the same as a value of the second index, the filter corresponding to the first index is the same as the filter corresponding to the second index.

In a feasible implementation, the to-be-processed image further includes a plurality of second chroma blocks, the second chroma block includes a plurality of adjacent second chroma pixels, and the obtaining module 2001 is further configured to obtain a third index of the second chroma block, where the third index represents a filter type applicable to an image feature corresponding to the second chroma block; and correspondingly, the filtering module 2002 is further configured to filter the second chroma block by applying a filter, corresponding to the third index, in the filter set.

In a feasible implementation, the obtaining module 2001 is specifically configured to classify the luma blocks based on a first relationship, to obtain the first index, where the first relationship includes texture direction and a variation intensity of an image area corresponding to the luma block.

In a feasible implementation, the texture direction and the variation intensity of the image area corresponding to the luma block are determined by using a pixel at a preset location in the luma block and a neighborhood pixel of the pixel at the preset location in the luma block.

In a feasible implementation, the obtaining module 2001 is specifically configured to classify the first chroma blocks based on a second relationship, to obtain the second index, where the second relationship includes texture direction and a variation intensity of an image area corresponding to the first chroma block.

In a feasible implementation, the texture direction and the variation intensity of the image area corresponding to the first chroma block are determined by using a pixel at a preset location in the first chroma block and a neighborhood pixel of the pixel at the preset location in the first chroma block.

In a feasible implementation, the obtaining module 2001 is specifically configured to use the first index of the luma block in the same image area corresponding to the first chroma block as the second index.

In a feasible implementation, the obtaining module 2001 is specifically configured to classify the second chroma blocks based on a third relationship, to obtain the third index, where the third relationship includes texture direction and a variation intensity of an image area corresponding to the second chroma block.

In a feasible implementation, the texture direction and the variation intensity of the image area corresponding to the second chroma block are determined by using a pixel at a preset location in the second chroma block and a neighborhood pixel of the pixel at the preset location in the second chroma block.

In a feasible implementation, the obtaining module 2001 is specifically configured to use the first index of the luma block in the same image area corresponding to the second chroma block as the third index; or use the second index of the first chroma block in the same image area corresponding to the second chroma block as the third index.

In a feasible implementation, at least two of the first relationship, the second relationship, and the third relationship are the same.

In a feasible implementation, the first relationship, the second relationship, and the third relationship are different from each other.

In a feasible implementation, a size of the first chroma block is greater than that of the luma block; and a size of the second chroma block is greater than that of the luma block.

In a feasible implementation, the apparatus is used for a decoder, and the apparatus further includes a decoding module 2003, configured to parse a bitstream, to obtain information about the filter set.

In a feasible implementation, the apparatus is used for an encoder, and the apparatus further includes an encoding module 2004, configured to: select a candidate filter set with minimum encoding cost from preset candidate filters set as the filter set; and encode information about the filter set.

In a feasible implementation, the apparatus further includes: a partitioning module 2005, configured to partition luma pixels of the to-be-processed image into a plurality of luma control blocks based on a first structure, where each luma control block includes one or more adjacent luma blocks; and an identification module 2006, configured to determine one or more to-be-filtered luma control blocks in the to-be-processed image, where luma filtering identifiers represent whether the respective luma control blocks in the to-be-processed image are to be filtered.

In a feasible implementation, the partitioning module 2005 is specifically configured to: partition the luma pixels of the to-be-processed image into one or more equal-sized first initially partitioned blocks based on a preset size; and perform quadtree or binary-tree partitioning on the first initially partitioned blocks, to obtain the plurality of luma control blocks.

In a feasible implementation, the apparatus is used for the decoder, and the decoding module 2003 is further configured to decode the bitstream, to obtain information about the luma filtering identifiers.

In a feasible implementation, the apparatus is used for the encoder, and the encoding module 2004 is further configured to select candidate luma filtering identifiers with minimum encoding cost from a preset candidate luma filtering identifier set as the luma filtering identifiers.

In a feasible implementation, the encoding module 2004 is further configured to encode information about the luma filtering identifiers.

In a feasible implementation, the identification module 2006 is further configured to determine one or more to-be-filtered first chroma control blocks in the to-be-processed image, where first chroma filtering identifiers represent whether the respective first chroma control blocks in the to-be-processed image are to be filtered, and each first chroma control block includes one or more adjacent first chroma blocks.

In a feasible implementation, the partitioning module 2005 is further configured to partition first chroma pixels of the to-be-processed image into a plurality of first chroma control blocks based on the first structure; and correspondingly, the identification module 2006 is further configured to obtain the first chroma filtering identifiers by mapping the luma filtering identifiers.

In a feasible implementation, the partitioning module 2005 is further configured to partition first chroma pixels of the to-be-processed image into a plurality of first chroma control blocks based on a second structure.

In a feasible implementation, the partitioning module 2005 is further specifically configured to: partition the first chroma pixels of the to-be-processed image into one or more equal-sized second initially partitioned blocks based on a preset size; and perform quadtree or binary-tree partitioning on the second initially partitioned blocks, to obtain the plurality of first chroma control blocks.

In a feasible implementation, the apparatus is used for the decoder, and the decoding module 2003 is further configured to decode the bitstream, to obtain information about the first chroma filtering identifiers.

In a feasible implementation, the apparatus is used for the encoder, and the encoding module 2004 is further configured to select candidate first chroma filtering identifiers with minimum encoding cost from a preset candidate first chroma filtering identifier set as the first chroma filtering identifiers.

In a feasible implementation, the encoding module 2004 is further configured to encode information about the first chroma filtering identifiers.

In a feasible implementation, the identification module 2006 is further configured to determine one or more to-be-filtered second chroma control blocks in the to-be-processed image, where second chroma filtering identifiers represent whether the respective second chroma control block in the to-be-processed image are to be filtered, and each second chroma control block includes one or more adjacent second chroma blocks.

In a feasible implementation, the partitioning module 2005 is further configured to partition second chroma pixels of the to-be-processed image into a plurality of second chroma control blocks based on the first structure; and correspondingly, the identification module 2006 is further configured to obtain the second chroma filtering identifiers by mapping the luma filtering identifiers.

In a feasible implementation, the partitioning module 2005 is further configured to partition second chroma pixels of the to-be-processed image into a plurality of second chroma control blocks based on the second structure; and correspondingly, the identification module 2006 is further configured to obtain the second chroma filtering identifiers by mapping the first chroma filtering identifiers.

In a feasible implementation, the partitioning module 2005 is further configured to partition second chroma pixels of the to-be-processed image into a plurality of second chroma control blocks based on a third structure.

In a feasible implementation, the partitioning module 2005 is further specifically configured to: partition the second chroma pixels of the to-be-processed image into one or more equal-sized third initially partitioned blocks based on a preset size; and perform quadtree or binary-tree partitioning on the third initially partitioned blocks, to obtain the plurality of second chroma control blocks.

In a feasible implementation, the apparatus is used for the decoder, and the decoding module 2003 is further configured to decode the bitstream, to obtain information about the second chroma filtering identifiers.

In a feasible implementation, the apparatus is used for the encoder, and the encoding module 2004 is further configured to select candidate second chroma filtering identifiers with minimum encoding cost from a preset candidate second chroma filtering identifier set as the second chroma filtering identifiers.

In a feasible implementation, the encoding module 2004 is further configured to encode information about the second chroma filtering identifiers.

In a feasible implementation, at least two of the first structure, the second structure, and the third structure are the same.

In a feasible implementation, the first structure, the second structure, and the third structure are different from each other.

Figure 34:
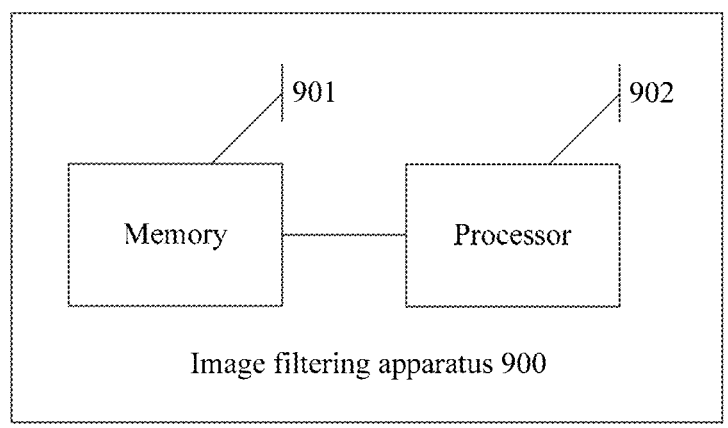
FIG. 34 is a schematic structural diagram of another image filtering apparatus according to an embodiment of the present invention.

As shown in FIG. 34, FIG. 34 is a schematic block diagram of another image filtering apparatus according to an embodiment of the present invention. Details are described below.

This embodiment of the present invention provides an image filtering apparatus 900, including a memory 901 and a processor 902 coupled to the memory. The memory is configured to store code and an instruction. A to-be-processed image includes a plurality of luma blocks and a plurality of first chroma blocks, the luma block includes a plurality of adjacent luma pixels, the first chroma block includes a plurality of adjacent first chroma pixels, and based on the code and the instruction, the processor 902 is configured to: obtain a first index of the luma block, where the first index represents a filter type applicable to an image feature corresponding to the luma block; obtain a second index of the first chroma block, where the second index represents a filter type applicable to an image feature corresponding to the first chroma block; filter the luma block by applying a filter, corresponding to the first index, in a filter set; and filter the first chroma block by applying a filter, corresponding to the second index, in the filter set. The processor 902 may further specifically execute various feasible implementations of the image filtering methods in the foregoing embodiments. Details are not described again.

It can be learned from the foregoing technical solutions that, the embodiments of the present invention provide an image filtering method and apparatus, so that image filtering accuracy can be improved, an image distortion rate can be reduced, and a bit rate occupied for transmitting a filtering coefficient can be reduced.

It should be noted that, the apparatus division is merely logical function division, but the present invention is not limited to the foregoing division, as long as corresponding functions can be implemented. In addition, specific names of the functional units are merely provided for the purpose of distinguishing the units from one another, but are not intended to limit the protection scope of the present invention.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of a software functional unit.

When the integrated unit is implemented in the form of a software functional unit and sold or used as an independent product, the integrated unit may be stored in a computer-readable storage medium. Based on such an understanding, all or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present invention. The storage medium is a non-transitory (English: non-transitory) medium, and includes any medium that can store program code, such as a flash memory, a removable hard disk, a read-only memory, a random access memory, a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An image filtering method, wherein a to-be-processed image comprises a plurality of luma blocks and a plurality of first chroma blocks, and the method comprises:
    obtaining a first class index value of each of the luma blocks, wherein the first class index value represents a category to which the each of the luma blocks belongs in a first class;
    obtaining a second class index value of each of the first chroma blocks, wherein the second class index value represents a category to which the each of the first chroma blocks belongs in a second class;
    filtering a first set of luma blocks and first chroma blocks by applying a first adaptive loop filter (ALF) in a filter set, wherein a first class index value of each luma block of the first set and a second class index value of each first chroma block of the first set have a same class index value which corresponds to a first filter index value, and the first filter index value is corresponding to the first ALF in the filter set; and
    filtering a second set of luma blocks and first chroma blocks by applying a second ALF in the filter set, wherein a first class index value of each luma block of the second set and a second class index value of each first chroma block of the second set have a same class index value which corresponds to a second filter index value, and the second filter index value is corresponding to the second ALF in the filter set.

2. The method according to claim 1, wherein the to-be-processed image further comprises a plurality of second chroma blocks, and the method further comprises:
    obtaining a third class index value of each of the second chroma blocks, wherein the third class index value represents a category to which the each of the second chroma blocks belongs in a third class; and
    filtering a third set of luma blocks, first chroma blocks and second chroma blocks by applying a third ALF in the filter set, wherein a first class index value of each luma block of the third set, a second class index value of each first chroma block of the third set, and a third class index value of each second chroma block of the third set have a same class index value which corresponds to a third filter index value, and the third filter index value is corresponding to the third ALF in the filter set.

3. The method according to claim 1, wherein the obtaining the second class index value of each of the first chroma blocks comprises:
    classifying the first chroma blocks based on a relationship to obtain the second class index value of each of the first chroma blocks, wherein the relationship comprises a texture direction and a variation intensity of an image area corresponding to each of the first chroma blocks.

4. The method according to claim 3, wherein the each of the first chroma blocks comprises a plurality of adjacent first chroma pixels, and wherein the texture direction and the variation intensity of the image area corresponding to the each of the first chroma blocks are obtained by using a first chroma pixel at a preset location in the each of the first chroma blocks and a neighborhood pixel of the first chroma pixel at the preset location in the each of the first chroma blocks.

5. The method according to claim 1, wherein the method is used for a decoder, and before the obtaining the first class index value of each of the luma blocks, the method further comprises:
    parsing a bitstream to obtain information about the filter set.

6. An image filtering apparatus, wherein a to-be-processed image comprises a plurality of luma blocks and a plurality of first chroma blocks and the apparatus comprises:
    a memory storage comprising instructions; and
    one or more processors in communication with the memory storage, wherein the one or more processors execute instructions to:
    obtain a first class index value of each of the luma blocks, wherein the first class index value represents a category to which the each of the luma blocks belongs in a first class;
    obtain a second class index value of each of the first chroma blocks, wherein the second class index value represents a category to which the each of the first chroma blocks belongs in a second class;
    filter a first set of luma blocks and first chroma blocks by applying a first adaptive loop filter (ALF) in a filter set, wherein a first class index value of each luma block of the first set and a second class index value of each first chroma block of the first set have a same class index value which corresponds to a first filter index value, and the first filter index value is corresponding to the first ALF in the filter set; and
    filter a second set of luma blocks and first chroma blocks by applying a second ALF in the filter set, wherein a first class index value of each luma block of the second set and a second class index value of each first chroma block of the second set have a same class index value which corresponds to a second filter index value, and the second filter index value is corresponding to the second ALF in the filter set.

7. The apparatus according to claim 6, wherein the to-be-processed image further comprises a plurality of second chroma blocks, and wherein the one or more processors further execute the instructions to:

obtain a third class index value of each of the second chroma blocks, wherein the third class index value represents a category to which the each of the second chroma blocks belongs in a third class; and filter a third set of luma blocks, first chroma blocks and second chroma blocks by applying a third ALF in the filter set, wherein A first class index value of each luma block of the third set, A second class index value of each first chroma block of the third set and A third class index value of each second chroma block of the third set have a same class index value which corresponds to a third filter index value, and the third filter index value is corresponding to the third ALF in the filter set.

8. The apparatus according to claim 6, wherein the one or more processors further execute the instructions to: classify the first chroma blocks based on a relationship to obtain the second class index value of each of the first chroma blocks, wherein the relationship comprises a texture direction and a variation intensity of an image area corresponding to each of the first chroma blocks.

9. The apparatus according to claim 8, wherein the each of the first chroma blocks comprises a plurality of adjacent first chroma pixels, and wherein the texture direction and the variation intensity of the image area corresponding to each of the first chroma blocks are obtained by using a first chroma pixel at a preset location in each of the first chroma blocks and a neighborhood pixel of the first chroma pixel at the preset location in each of the first chroma blocks.

10. The apparatus according to claim 6, wherein the apparatus is used for a decoder, and wherein the one or more processors further execute the instructions to:

parse a bitstream to obtain information about the filter set.

11. The method according to claim 1, wherein obtaining the first class index value of each of the luma blocks comprises:

classifying the plurality of luma blocks based on texture directions and variation intensities of image areas corresponding to the plurality of first chroma blocks; and obtaining the first class index value of the each of the luma blocks based on a texture direction and a variation intensity of an image area corresponding to the each of the luma blocks.

12. The method according to claim 1, wherein there is a first correspondence between a plurality of first class index values and a plurality of filter index values, and there is a second correspondence between a plurality of second class index values and a plurality of filter index values.

13. The method according to claim 12, wherein the first correspondence comprises:

a first class index value "0" is corresponding to a category-a filter, a first class index value "1" is corresponding to a category-b filter, a first class index value "2" is corresponding to a category-c filter, and a first class index value "3" is corresponding to a category-d filter;

or wherein the second correspondence comprises:

a second class index value "0" is corresponding to a category-a filter, a second class index value "1" is corresponding to a category-b filter, a second class index value "2" is corresponding to a category-c filter, and a second class index value "3" is corresponding to a category-d filter.

14. The method according to claim 1, wherein same first class index values and same second class index values indicate that corresponding luma blocks and corresponding first chroma blocks are of a same category.

15. The method according to claim 2, wherein same first class index values and same second class index values and same third class index values indicate that corresponding luma blocks and corresponding first chroma blocks and corresponding second chroma blocks are of a same category.

* * * * *